(12) United States Patent
Li et al.

(10) Patent No.: US 12,004,021 B2
(45) Date of Patent: Jun. 4, 2024

(54) COMMUNICATIONS METHOD AND APPARATUS

(71) Applicant: Huawei Technologies Co., Ltd., Shenzhen (CN)

(72) Inventors: Huan Li, Shanghai (CN); Hualin Zhu, Shanghai (CN); Guowei Ouyang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 653 days.

(21) Appl. No.: 17/158,571

(22) Filed: Jan. 26, 2021

(65) Prior Publication Data
US 2021/0153081 A1    May 20, 2021

Related U.S. Application Data

(63) Continuation of application No. PCT/CN2019/104952, filed on Sep. 9, 2019.

(30) Foreign Application Priority Data

Sep. 30, 2018   (CN) .......................... 201811154454.9

(51) Int. Cl.
*H04W 4/00*    (2018.01)
*H04W 36/00*   (2009.01)
(Continued)

(52) U.S. Cl.
CPC ... *H04W 36/0027* (2013.01); *H04W 36/0033* (2013.01); *H04W 48/16* (2013.01); *H04W 76/11* (2018.02)

(58) Field of Classification Search
CPC ............. H04W 36/0027; H04W 48/16; H04W 36/0033; H04W 76/11; H04W 36/00
(Continued)

(56) References Cited

U.S. PATENT DOCUMENTS 9,906,992 B1    2/2018  Youtz et al.
11,553,064 B2 *  1/2023  Gan ...................... H04L 69/322
(Continued)

FOREIGN PATENT DOCUMENTS

CN   101286915 A   10/2008
CN   101626611 A    1/2010
(Continued)

OTHER PUBLICATIONS

3GPP TS 23.401 V16.0.0 (Sep. 2018) "3rd Generation Partnership Project; Technical Specification Group Services and System Aspects; General Packet Radio Service (GPRS) enhancements for Evolved Universal Terrestrial Radio Access Network (E-UTRAN) access (Release 16)," 410 pages.
(Continued)

*Primary Examiner* — Marceau Milord
(74) *Attorney, Agent, or Firm* — Conley Rose, P.C.

(57) ABSTRACT

A communications method includes receiving, by a session management network element, a message for requesting to establish or modify a session, and determining, by the session management network element based on an access technology type corresponding to the session, whether to send a request message to an access management network element in the first communications network, where the request message requests the access management network element to allocate a connection identifier of a connection of the session in a second communications network.

17 Claims, 9 Drawing Sheets

(51) Int. Cl.
*H04W 48/16* (2009.01)
*H04W 76/11* (2018.01)

(58) Field of Classification Search
USPC .......................................................... 370/329
See application file for complete search history.

(56) References Cited

U.S. PATENT DOCUMENTS

| | | | |
|---|---|---|---|
| 11,553,379 B2* | 1/2023 | Park ........................ | H04L 41/08 |
| 2011/0099604 A1 | 4/2011 | Zhou et al. | |
| 2012/0172036 A1* | 7/2012 | Bhalla ............... | H04W 36/0033 |
| | | | 455/432.1 |
| 2013/0070596 A1 | 3/2013 | Yeh et al. | |
| 2016/0135222 A1* | 5/2016 | Jain ........................ | H04W 4/24 |
| | | | 370/329 |
| 2018/0062819 A1 | 3/2018 | Horn et al. | |
| 2018/0192337 A1 | 7/2018 | Ryu et al. | |
| 2018/0220478 A1 | 8/2018 | Zhu et al. | |
| 2018/0234903 A1 | 8/2018 | Jheng et al. | |
| 2018/0352490 A1 | 12/2018 | Hu et al. | |
| 2019/0215724 A1* | 7/2019 | Talebi Fard .......... | H04W 48/16 |
| 2019/0261260 A1* | 8/2019 | Dao ........................ | H04W 8/08 |
| 2019/0313468 A1* | 10/2019 | Talebi Fard .......... | H04W 76/12 |
| 2019/0335392 A1* | 10/2019 | Qiao ...................... | H04W 48/16 |
| 2019/0394833 A1* | 12/2019 | Talebi Fard ........ | H04W 68/005 |
| 2020/0053828 A1* | 2/2020 | Bharatia ............... | H04W 76/11 |
| 2020/0077315 A1* | 3/2020 | Jin ...................... | H04W 28/0268 |
| 2021/0227598 A1 | 7/2021 | Xin et al. | |
| 2021/0360501 A1* | 11/2021 | Jin ................... | H04W 36/0022 |

FOREIGN PATENT DOCUMENTS

| | | |
|---|---|---|
| CN | 103686846 A | 3/2014 |
| CN | 105744598 A | 7/2016 |
| CN | 107925904 A | 4/2018 |
| CN | 108293183 A | 7/2018 |
| CN | 108400997 A | 8/2018 |
| CN | 108513726 A | 9/2018 |
| CN | 108541031 A | 9/2018 |
| EP | 2897438 A1 | 7/2015 |
| WO | 2016163808 A1 | 10/2016 |
| WO | 2018038012 A1 | 3/2018 |
| WO | 2018170696 A1 | 9/2018 |

OTHER PUBLICATIONS

3GPP TS 23.501 V15.3.0 (Sep. 2018) "3rd Generation Partnership Project; Technical Specification Group Services and System Aspects; System Architecture for the 5G System; Stage 2 (Release 15)," 226 pages.

3GPP TS 23.502 V15.1.0 (Mar. 2018) "3rd Generation Partnership Project; Technical Specification Group Services and System Aspects; Procedures for the 5G System; Stage 2 (Release 15)," 285 pages.

3GPP TS 23.502 V15.3.0 (Sep. 2018), "3rd Generation Partnership Project; Technical Specification Group Services and System Aspects; Procedures for the 5G System; Stage 2 (Release 15)," 330 pages.

3GPP TS 23.503 V15.3.0 (Sep. 2018), "3rd Generation Partnership Project; Technical Specification Group Services and System Aspects; Policy and Charging Control Framework for the 5G System; Stage 2 (Release 15)," 70 pages.

China Mobile "Clarifications for HO procedure from 5GS to EPC with SR UE using N26," SA WG2 Meeting #122bis S2-175483, Aug. 21-25, 2017, Sophia Antipolis, France, 19 pages.

ZTE, "Clarification on the EBI revocation," 3GPP TSG-SA WG2 Meeting #129, S2-1810592, Oct. 15-19, 2018, Dongguan, China, 5 pages.

CATT, et al., "Discussion on EPS bearer ID allocation," SA WG2 Meeting #122bis, Aug. 21-25, 2017, Sophia Antipolis, France, S2-175877, 3 pages.

LG Electronics, "Correction to Service Request QoS when changing between non-3GPP and 3GPP accesses," 3GPP TSG-SA WG2 Meeting #128bis, Sophia Antipolis, France, Aug. 20-24, 2018, S2-188121, 13 pages.

* cited by examiner

COMMUNICATIONS METHOD AND APPARATUS

CROSS-REFERENCE TO RELATED APPLICATIONS

This application is a continuation of International Patent Application No. PCT/CN2019/104952 filed on Sep. 9, 2019, which claims priority to Chinese Patent Application No. 201811154454.9 filed on Sep. 30, 2018. The disclosures of the aforementioned applications are hereby incorporated by reference in their entireties.

TECHNICAL FIELD

Embodiments of this application relate to a communications method and apparatus.

BACKGROUND

In a fifth generation (5G) communications network, in a process of establishing or modifying a packet data unit (PDU) session, an access and mobility management function (AMF) network element allocates, in an Evolved Packet System (EPS), an EPS bearer identity (EBI) to a flow in the session. However, after a terminal device accesses a 5G core network using a non-3rd Generation Partnership Project (Non-3GPP) technology, if the terminal device is in an idle state and needs to access an Evolved Packet Core (EPC) network, the terminal device cannot change from accessing the 5G network using the non-3GPP technology to accessing the EPS using a 3GPP technology.

SUMMARY

Embodiments of this application provide a communications method and a communications apparatus, to resolve a problem that a terminal device cannot handover from accessing a 5G network using a non-3GPP technology to accessing an EPS using a 3GPP technology.

According to a first aspect of this application, a communications method is provided. The method includes receiving, by a session management network element in a first communications network, a message for requesting to establish or modify a session, and determining, by the session management network element based on an access technology type corresponding to the session, whether to send a request message to an access management network element in the first communications network, where the request message is used to request the access management network element to allocate a connection identifier of a connection of the session in a second communications network.

In a first possible implementation of the first aspect, determining, by the session management network element based on an access technology type corresponding to the session, whether to send a request message to an access management network element in the first communications network includes determining, by the session management network element, that the access technology type corresponding to the session is non-3rd generation partnership project 3GPP access, and skipping, by the session management network element, sending the request message to the access management network element.

With reference to the first aspect and the first possible implementation of the first aspect, in a second possible implementation of the first aspect, the method further includes receiving, by the session management network element, the access technology type that corresponds to the session from the access management network element.

With reference to the first possible implementation of the first aspect and the second possible implementation of the first aspect, in a third possible implementation of the first aspect, the method further includes determining, by the session management network element in a service request process, that the access technology type corresponding to the session is changed from non-3GPP access to 3GPP access, sending, by the session management network element, the request message to the access management network element, and receiving, by the session management network element, the connection identifier that is of the connection of the session in the second communications network from the access management network element.

With reference to the third possible implementation of the first aspect, in a fourth possible implementation of the first aspect, the method further includes sending, by the session management network element, the connection identifier of the connection of the session in the second communications network to an access network device and a terminal device.

With reference to the fourth possible implementation of the first aspect, in a fifth possible implementation of the first aspect, sending, by the session management network element, the connection identifier of the connection of the session in the second communications network to an access network device and a terminal device includes sending, by the session management network element, the connection identifier of the connection of the session in the second communications network to the access network device and the terminal device using a session modification procedure.

According to a second aspect of this application, a communications method is provided. The method includes determining, by a session management network element in a first communications network, that an access technology type corresponding to a session of a terminal device is changed from 3GPP access to non-3GPP access, and releasing, by the session management network element, a connection identifier of a connection of the session in a second communications network.

According to a third aspect of this application, a communications method is provided. The method includes determining, by a session management network element in a first communications network, that a terminal device changes from accessing the first communications network using a non-3GPP technology to accessing a second communications network using a 3GPP technology, and releasing, by the session management network element, a connection identifier of a connection of a session in the second communications network.

In a first possible implementation of the second aspect or the third aspect, the method further includes sending, by the session management network element, a notification message to an access management network element in the first communications network, where the notification message is used to indicate the access management network element to release the connection identifier of the connection of the session in the second communications network.

With reference to the first possible implementation of the second aspect or the third aspect, in a second possible implementation of the second aspect or the third aspect, the notification message includes cause information for releasing the connection identifier.

With reference to the first possible implementation and the second possible implementation of the second aspect or the third aspect, in a third possible implementation of the second aspect or the third aspect, the notification message includes status information of the session.

With reference to the third possible implementation and the second possible implementation of the second aspect or the third aspect, in a fourth possible implementation of the second aspect or the third aspect, the status information of the session includes "release" or "handover".

In any possible implementation of the second aspect or the third aspect, the method further includes receiving, by the session management network element, a session context establishment request message sent by the access management network element in the first communications network, and determining, by a session management network element, that an access technology type corresponding to a session of a terminal device is changed from 3GPP access to non-3GPP access includes determining, by the session management network element based on the session context establishment request message, that the access technology type corresponding to the session of the terminal device is changed from 3GPP access to non-3GPP access.

In any possible implementation of the second aspect or the third aspect, the method further includes sending, by the session management network element, first indication information to a user plane network element, where the first indication information is used to indicate the user plane network element to release tunnel information of the connection of the session in the second communications network.

In any possible implementation of the second aspect or the third aspect, the method further includes sending, by the session management network element, second indication information to the terminal device, where the second indication information is used to indicate the terminal device to release the connection identifier of the connection of the session in the second communications network.

According to a fourth aspect of this application, a communications method is provided. The method includes receiving, by a terminal device, context information that is of a connection of the terminal device in a second communications network from a core network element in a first communications network, obtaining, by the terminal device, an access technology type corresponding to the context information, and when the terminal device accesses the second communications network using a 3GPP technology, determining, by the terminal device based on the access technology type corresponding to the context information, to initiate a tracking area update (TAU) procedure or an attach procedure, where an attach request in the attach procedure includes handover indication information.

In a first possible implementation of the fourth aspect, obtaining, by the terminal device, an access technology type corresponding to the context information includes receiving, by the terminal device, the access technology type that corresponds to the context information from the core network element.

In a second possible implementation of the fourth aspect, obtaining, by the terminal device, an access technology type corresponding to the context information includes obtaining, by the terminal device, the access technology type corresponding to the context information, based on an access technology type of a connection of the terminal device in the first communications network, where the connection of the terminal device in the first communications network corresponds to the connection of the terminal device in the second communications network.

With reference to the fourth aspect and the first and the second possible implementations, in a third possible implementation of the fourth aspect, determining, by the terminal device based on the access technology type corresponding to the context information, to initiate a TAU procedure or an attach procedure includes initiating, by the terminal device, the TAU procedure if the access technology type corresponding to the context information of the terminal device in the second communications network is 3GPP access.

With reference to the fourth aspect and the first and the second possible implementations, in a fourth possible implementation of the fourth aspect, determining, by the terminal device based on the access technology type corresponding to the context information, to initiate a TAU procedure or an attach procedure includes initiating, by the terminal device, the attach procedure if the access technology type corresponding to the context information of the terminal device in the second communications network is non-3GPP access.

With reference to the fourth possible implementation of the fourth aspect, in a fifth possible implementation of the fourth aspect, in a process in which the terminal device initiates the attach procedure, the terminal device sends indication information to the core network element, where the indication information is used to indicate the core network element to release the context information of the connection of the terminal device in the second communications network.

With reference to the fourth aspect and the first and the second possible implementations, in a sixth possible implementation of the fourth aspect, the context information of the terminal device in the second communications network includes first partial context information and second partial context information, an access technology type corresponding to the first partial context information is 3GPP access, an access technology type corresponding to the second partial context information is non-3GPP access, and determining, by the terminal device based on the access technology type corresponding to the context information, to initiate a TAU procedure or an attach procedure includes initiating, by the terminal device, the TAU procedure using the first partial context information, and changing, by the terminal device using a packet data network (PDN) establishment procedure, a session corresponding to the second partial context information to a session that accesses the second communications network using a 3GPP technology.

With reference to the fourth aspect and the first and the second possible implementations, in a seventh possible implementation of the fourth aspect, the context information of the terminal device in the second communications network includes first partial context information and second partial context information, an access technology type corresponding to the first partial context information is 3GPP access, an access technology type corresponding to the second partial context information is non-3GPP access, and determining, by the terminal device based on the access technology type corresponding to the context information, to initiate a TAU procedure or an attach procedure includes initiating, by the terminal device, the attach procedure using the second partial context information, and initiating, by the terminal device, the TAU procedure using the first partial context information.

With reference to the fourth aspect and the first and the second possible implementations, in an eighth possible implementation of the fourth aspect, the terminal device accesses the first communications network using a first session of the 3GPP technology, the terminal device accesses the first communications network using a second session of a non-3GPP technology, an access technology type corresponding to context information of a connection of the first session in the second communications network is 3GPP access, and the determining, by the terminal device based on the access technology type corresponding to the context information, to initiate a TAU procedure or an attach procedure includes initiating, by the terminal device, the TAU procedure using the context information, and changing, by the terminal device using a PDN establishment procedure, the second session to a session that accesses the second communications network using the 3GPP technology.

In any possible implementation of the fourth aspect, the method further includes releasing, by the terminal device, the context information of the connection of the terminal device in the second communications network.

According to a fifth aspect of this application, a communications method is provided. The method includes receiving, by a terminal device, context information that is of a connection of the terminal device in a second communications network from a core network element in a first communications network, obtaining, by the terminal device, an activation status of the context information, and when the terminal device accesses the second communications network using a 3GPP technology, determining, by the terminal device based on the activation status of the context information, to initiate a TAU procedure or an attach procedure, where an attach request in the attach procedure includes handover indication information.

In a first possible implementation of the fifth aspect, determining, by the terminal device based on the activation status of the context information, to initiate a TAU procedure or an attach procedure includes initiating, by the terminal device, the TAU procedure if the context information of the terminal device in the second communications network is in an active state.

In a second possible implementation of the fifth aspect, determining, by the terminal device based on the activation status of the context information, to initiate a TAU procedure or an attach procedure includes initiating, by the terminal device, the attach procedure if the context information of the terminal device in the second communications network is in an inactive state.

In a third possible implementation of the fifth aspect, the context information of the terminal device in the second communications network includes first partial context information and second partial context information, the first partial context information is in the active state, the second partial context information is in the inactive state, and determining, by the terminal device based on the activation status of the context information, to initiate a TAU procedure or an attach procedure includes initiating, by the terminal device, the TAU procedure using the first partial context information, and changing, by the terminal device using a PDN establishment procedure, a session corresponding to the second partial context information to a session that accesses the second communications network using the 3GPP technology.

In a fourth possible implementation of the fifth aspect, the context information of the terminal device in the second communications network includes first partial context information and second partial context information, the first partial context information is in the active state, the second partial context information is in the inactive state, and determining, by the terminal device based on the activation status of the context information, to initiate a TAU procedure or an attach procedure includes initiating, by the terminal device, the TAU procedure using the first partial context information, and initiating, by the terminal device, the attach procedure using the second partial context information.

In a fifth possible implementation of the fifth aspect, the terminal device accesses the first communications network using a first session of the 3GPP technology, the terminal device accesses the first communications network using a second session of a non-3GPP technology, context information of a connection of the first session in the second communications network is in the active state, and determining, by the terminal device based on the activation status of the context information, to initiate a TAU procedure or an attach procedure includes initiating, by the terminal device, the TAU procedure using the context information, and changing, by the terminal device using a PDN establishment procedure, the second session to a session that accesses the second communications network using the 3GPP technology.

According to a sixth aspect of this application, a communications apparatus is provided. The apparatus includes a communications unit configured to receive a message for requesting to establish or modify a session, and a processing unit configured to determine, based on an access technology type corresponding to the session, whether to send a request message to an access management network element in the first communications network, where the request message is used to request the access management network element to allocate a connection identifier to a connection of the session in a second communications network.

According to a seventh aspect of this application, a communications apparatus is provided. The apparatus includes a processing unit and a communications unit, where the processing unit sends and receives a signal through the communications unit, the processing unit is configured to determine that an access technology type corresponding to a session of a terminal device is changed from 3GPP access to non-3GPP access, and the processing unit is further configured to release a connection identifier of a connection of the session in a second communications network.

According to an eighth aspect of this application, a communications apparatus is provided. The apparatus includes a processing unit and a communications unit, where the processing unit sends and receives a signal through the communications unit, the processing unit is configured to determine that a terminal device changes from accessing the first communications network using a non-3GPP technology to accessing a second communications network using a 3GPP technology, and the processing unit is further configured to release a connection identifier of a connection of the session in the second communications network.

The communications apparatuses in the sixth aspect to the eighth aspect of this application each may be a session management network element, or a chip or a chip system in the session management network element.

According to a ninth aspect of this application, a communications apparatus is provided. The apparatus includes a receiving unit configured to receive context information that is of a connection of a terminal device in a second communications network from a core network element in a first communications network, and a processing unit configured to obtain an access technology type corresponding to the context information, where the processing unit is further configured to determine that the terminal device accesses the second communications network using a 3GPP technology, and determine, based on the access technology type corresponding to the context information, to initiate a TAU procedure or an attach procedure, where an attach request in the attach procedure includes handover indication information.

According to a tenth aspect of this application, a communications apparatus is provided. The apparatus includes a receiving unit configured to receive context information that is of a connection of the terminal device in a second communications network from a core network element in a first communications network, and a processing unit configured to obtain an activation status of the context information, where the processing unit is further configured to determine that the terminal device accesses the second communications network using a 3GPP technology, and determine, based on the activation status of the context information, to initiate a TAU procedure or an attach procedure, where an attach request in the attach procedure includes handover indication information.

The communications apparatuses in the ninth aspect and the tenth aspect of this application each may be a terminal device, or a chip or a chip system in the terminal device.

According to an eleventh aspect of this application, a computer storage medium is provided. The computer-readable storage medium stores an instruction. When the instruction is run on a computer, the computer is enabled to perform any method in the first aspect to the fifth aspect and the possible implementations.

According to a twelfth aspect of this application, a computer program product including an instruction is provided. When the computer program product runs on a computer, the computer is enabled to perform any method in the first aspect to the fifth aspect and the possible implementations.

In any one of the foregoing aspects, the first communications network is a 5G network, the second communications network is a 4G network, the connection of the session in the second communications network is a bearer, and the connection identifier of the connection of the session in the second communications network is a bearer identifier.

According to the communications methods in the embodiments of this application, a problem that the terminal device fails to handover from accessing the 5G network using the non-3GPP technology to accessing an EPS using the 3GPP technology can be avoided.

DESCRIPTION OF EMBODIMENTS

Figure 1:
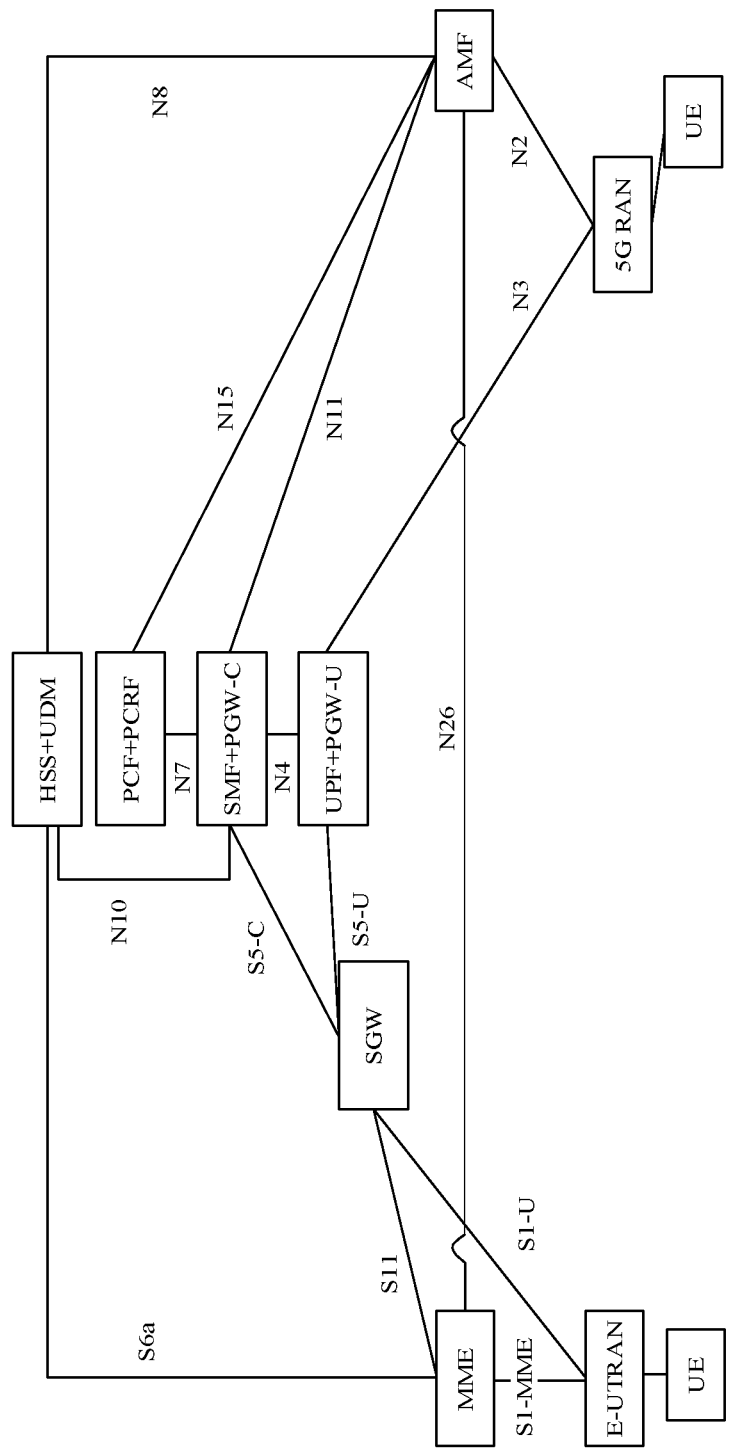
FIG. 1 is a schematic diagram of a communications system according to an embodiment of this application.

FIG. 1 is a schematic diagram of a communications system according to an embodiment of this application. In the communications system, a terminal device may perform interworking in a fourth generation (4G) communications network and a 5G communications network. The 4G network may be a Long-Term Evolution (LTE) network. The 4G communications network includes a 4G access network and a 4G core network (CN). The 4G core network is an EPC network. The 4G access network includes an Evolved Universal Terrestrial Radio Access Network (EUTRAN). The 4G core network includes a mobility management entity (MME), a serving gateway (SGW), a PDN gateway-user plane (PGW-U), a PDN gateway-control plane (PGW-C), a policy and charging rules function (PCRF), and a home subscriber server (HSS).

The 5G communications network includes a 5G access network and a 5G core network. The 5G access network includes a next generation radio access network (NG RAN). The 5G core network includes an AMF network element, a user plane function (UPF) network element, a session management function (SMF) network element, a policy control function (PCF) network element, and a unified data management (UDM).

In the system shown in FIG. 1, the HSS and the UDM may be deployed together, and represented by HSS+UDM. Further, a function of the UDM may be added to the HSS, or a function of the HSS is added to the UDM, or functions of both the HSS and the UDM are implemented on another device. Certainly, the HSS and the UDM may alternatively be deployed separately, and in communication connection with each other. This is not limited in this application.

The PCRF and the PCF may be deployed together, and represented by PCRF+PCF. Further, a function of the PCF may be added to the PCRF, or a function of the PCRF is added to the PCF, or functions of the PCRF and the PCF are implemented on another device. Certainly, the PCRF and the PCF may alternatively be deployed separately, and in communication connection with each other. This is not limited in this application.

The SMF and the PGW-C may be deployed together, and represented by SMF+PGW-C. Further, a function of the PGW-C may be added to the SMF, or a function of the SMF is added to the PGW-C, or functions of the SMF and the PGW-C are implemented on another device. Certainly, the SMF and the PGW-C may alternatively be deployed separately, and in communication connection with each other. This is not limited in this application.

The UPF and PGW-U may be deployed together, and represented by UPF+PGW-C. Further, a function of the PGW-U may be added to the UPF, or a function of the UPF is added to the PGW-U, or functions of the UPF and the PGW-U are implemented on another device. Certainly, the UPF and the PGW-U may alternatively be deployed separately, and in communication connection with each other. This is not limited in this application.

In the communications system shown in FIG. 1, the network elements perform communication connection using interfaces shown in the figure. When the terminal device is handed over between the 4G communications network and the 5G communications network, context information of the terminal device may be transmitted using an N26 interface between the MME network element and the AMF network element.

Figure 2:
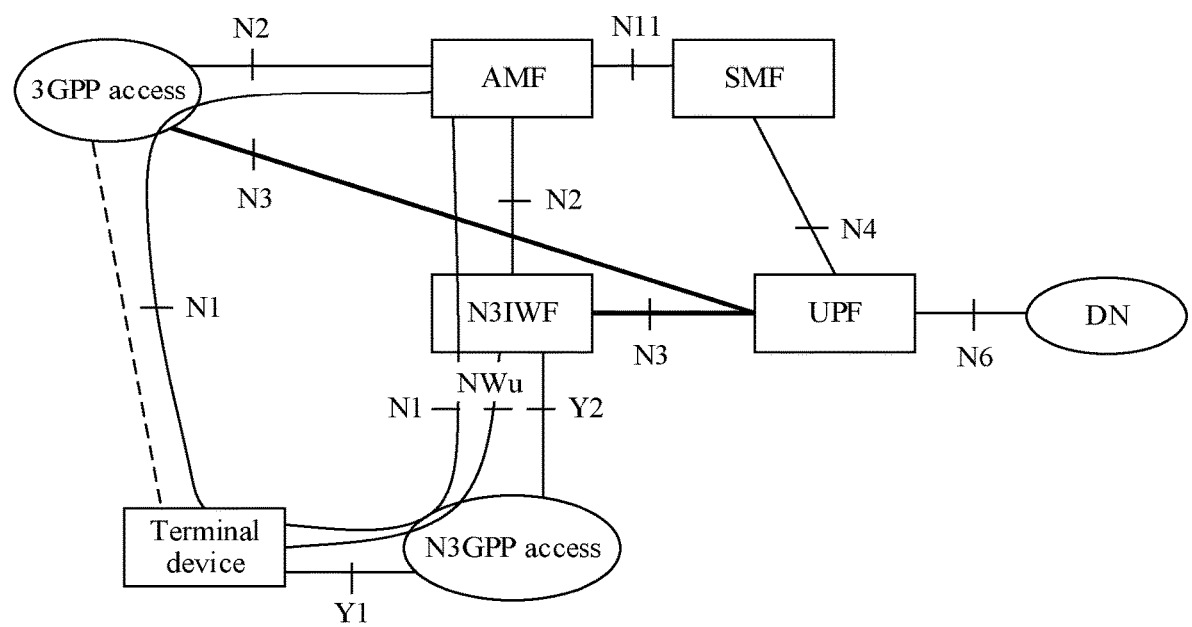
FIG. 2 is a schematic diagram of another communications system according to an embodiment of this application.

FIG. 2 is a schematic diagram of a 5G communications system according to an embodiment of this application. In the communications system, a terminal device may access a 5G core network using a 3GPP technology and/or a non-3GPP technology. Further, the terminal device accesses the 5G core network using a 3GPP access network device, or accesses the 5G core network using a non-3GPP access network device and a non-3GPP gateway device. In the embodiments of this application, the non-3GPP access network device may be a wireless access point (AP) in a wireless local area network (WLAN), an access device in Worldwide Interoperability for Microwave Access (WIMAX), a switch or router in a code-division multiple access (CDMA) network, or the like. The gateway device may be a non-3GPP interworking function (N3IWF) network element or the like. In the communications system shown in FIG. 2, network elements perform communication connection using interfaces shown in the figure. For example, a communications interface between an AMF network element and the 3GPP access network device is an N2 interface, a communications interface between the AMF network element and the N3IWF network element is an N2 interface, and a communications interface between the AMF network element and the terminal device is an N1 interface.

In the embodiments of this application, the gateway device may be a network element on an access network side. For example, the gateway device is an access network device. The gateway device may alternatively be a network element on a core network side.

In the embodiments of this application, the terminal device includes but is not limited to user equipment (UE), a subscriber unit, a subscriber station, a mobile station, a remote station, a remote terminal device, a mobile terminal device, a user terminal device, a terminal device, a wireless communications device, a user agent, a user apparatus, a cellular phone, a cordless phone, a Session Initiation Protocol (SIP) phone, a wireless local loop (WLL) station, a personal digital assistant (PDA), a handheld device with a wireless communication function, a computing device, a processing device connected to a wireless modem, a drone, a vehicle-mounted device, a wearable device, a terminal device in the internet of things, a virtual reality device, a terminal device in a 5G network, a terminal device in a future evolved public land mobile network (PLMN), or the like.

The AMF network element may implement at least one of performing access and mobility management, terminating a non-access stratum (NAS) message, completing registration management, connection management, and reachability management, allocating a tracking area (TA) list, transparently routing a session management (SM) message to an SMF network element, or the like.

The SMF network element may implement at least one of session management, Internet Protocol (IP) address assignment and management for the terminal device, allocation and selection of a user plane anchor function, or (re)selection of a UPF network element and a user plane path.

The UPF network element may be configured to forward and receive user data of the terminal device. For example, the UPF network element may receive user data from a data network, and transmit the user data to the terminal device through the access network device, or the UPF network element may receive user data from the terminal device through the access network device, and forward the user data to the data network. A transmission resource allocated and scheduled by the UPF network element for the terminal device is managed and controlled by the SMF network element.

A PCF network element has a policy control decision function, and provides a policy for a communications network.

In the communications systems shown in FIG. 1 and FIG. 2, functions of and interfaces between the network elements are merely examples. When the network elements are applied to the embodiments of this application, not all functions are necessary. All or a part of network elements in the core network may be physical entity network elements, or may be virtualized network elements. This is not limited herein.

In the embodiments of this application, a non-3GPP technology or a non-3GPP network is a technology or a network in which a terminal device accesses a 3GPP core network using a non-3GPP gateway device (for example, the N3IWF network element). For example, the non-3GPP network may be any one of a WI-FI technology, a WIMAX technology, a CDMA technology, a WLAN technology, a fixed network access technology, and the like.

The term "and/or" in the embodiments of this application describes only an association relationship for describing associated objects and represents that three relationships may exist. For example, A and/or B may represent only A exists, both A and B exist, and only B exists. In addition, in the descriptions of this application, "a plurality of" means two or more than two.

In the embodiments of this application, that a network element (for example, a network element A) obtains information from another network element (for example, a network element B) may mean that the network element A directly receives the information from the network element B, or may mean that the network element A receives the information from the network element B through another network element (for example, a network element C). When the network element A receives the information from the network element B through the network element C, the network element C may transparently transmit the information, or may process the information, for example, include the information in different messages for transmission, or filter the information and send only filtered information to the network element A. Similarly, in the embodiments of this application, that the network element A sends information to the network element B may mean that the network element A directly sends the information to the network element B, or may mean that the network element A sends the information to the network element B through another network element (for example, the network element C).

In the 5G communications network, a PDU session may be established or modified using a 3GPP access technology and/or a non-3GPP access technology. To accelerate a handover speed of the terminal device between the 5G network and the 4G network, in a PDU session establishment or modification procedure in the 5G network, the AMF network element allocates, in the EPS, an EBI to a flow in the session. The AMF network element sends the allocated EBI to the terminal device through the SMF network element. The terminal device stores the EBI in an EPS context. When the terminal device accesses the 5G core network using the non-3GPP technology, an access technology type corresponding to the session of the terminal device in the 5G network is non-3GPP access. If the terminal device is subsequently in an idle state and needs to access the 4G network using the 3GPP technology, because the terminal device stores the EPS context, according to an operation procedure in an existing protocol, the terminal device initiates a TAU procedure to access the 4G network. However, after receiving a TAU request sent by the terminal device, a 4G core network element rejects the TAU procedure because a 3GPP session context is not found. Then, the terminal device performs an initial attach procedure. As a result, the terminal device cannot complete a handover procedure from accessing the 5G network using the non-3GPP technology to accessing the EPS using the 3GPP technology.

The embodiments of this application provide a communications method, to resolve the problem that, because the AMF network element allocates the EBI to the session of a non-3GPP access type, the terminal device cannot handover from accessing the 5G network using the non-3GPP technology to accessing the EPS using the 3GPP technology. In the embodiments of this application, descriptions are provided using an example in which the 5G network is a first communications network, the 4G network is a second communications network, a connection of a PDU session in the second communications network is a bearer, a connection of the PDU session in the first communications network is a quality of service (QoS) flow, a session management network element is an SMF network element, a mobility management network element is an AMF network element, and the session is a PDU session.

Figure 3:
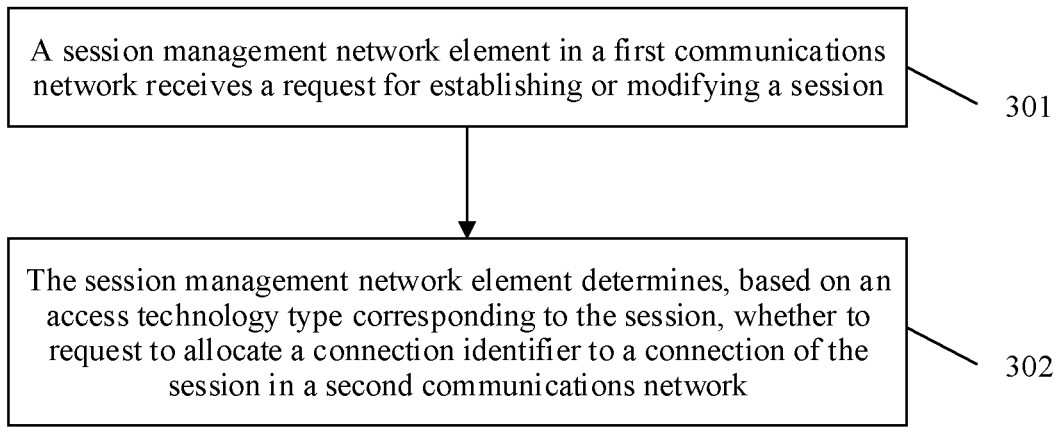
FIG. 3 is a schematic flowchart of a communications method according to a first embodiment of this application.

FIG. 3 is a schematic flowchart of a communications method according to a first embodiment of this application. Further, the communications method includes the following steps.

301: A session management network element in a first communications network receives a session establishment or session modification request.

In a possible implementation, in a session establishment or modification procedure initiated by a terminal device, the session management network element receives a message for requesting to establish or modify a session. For example, in the session establishment procedure initiated by the terminal device, the session management network element receives a create session management context request (createSMcontext request) sent by a mobility management network element, or in the session modification procedure initiated by the terminal device, the session management network element receives an update session management context request (updateSMcontext request) sent by the mobility management network element.

In another possible implementation, in a session modification procedure initiated by a network side (for example, a policy control network element), the session management network element receives the session modification request. For example, in the session modification procedure initiated by the network side, the session management network element receives an update session management context request (updateSMcontext request) sent by the mobility management network element.

In still another possible implementation, when the terminal device or a network side device changes the session from an access technology to another access technology, a session establishment or session modification procedure is also involved. For example, when the terminal device changes the session from a non-3GPP access technology to a 3GPP access technology, the PDU session establishment procedure needs to be initiated.

302: The session management network element determines, based on an access technology type corresponding to the session, whether to request to allocate a connection identifier to a connection of the session in a second communications network.

In this embodiment of this application, the access technology type corresponding to the session may be an access technology type currently used for the session. Further, the PDU session is a data transmission channel established by the terminal device to a user plane network element (for example, a UPF network element) through an access network device. When the access network device is a 3GPP access network device, the access technology type corresponding to the session is 3GPP access. When the access network device is a non-3GPP access network device, the access technology type corresponding to the session is non-3GPP access.

In a possible implementation, the session management network element receives the access technology type that corresponds to the session from an access management network element in the first communications network. Further, the access management network element may determine, based on a type of the access network device accessed by the terminal device, the access technology type corresponding to the session. In another possible implementation, the session management network element may store the access technology type corresponding to the session.

After the session management network element receives the session establishment or session modification request, the session management network element may allocate a connection identifier to a connection of the session in the first communications network. For example, the session management network element allocates an identifier (QoS flow identifier (QFI)) to a QoS flow in the session. In this embodiment of this application, for ease of description, the connection of the session in the first communications network is referred to as a first connection, and correspondingly, an identifier of the first connection is referred to as a first connection identifier. For example, the first connection is a QoS flow, and the first connection identifier is a QFI. The connection of the session in the second communications network is referred to as a second connection, and correspondingly, an identifier of the second connection is referred to as a second connection identifier. For example, the second connection is a bearer, and the second connection identifier is an EBI. In this embodiment of this application, there may be one or more first connections and second connections. This is not limited herein.

In this embodiment, the session management network element determines, based on the access technology type corresponding to the session, whether to send a request message to the access management network element in the first communications network. The request message is used to request the access management network element to allocate the second connection identifier.

Further, if the session management network element determines that the access technology type corresponding to the session is 3GPP access, the session management network element sends the request message to the access management network element. For example, the request message may be an EBI assignment request message. After receiving the request message, the access management network element allocates the second connection identifier to the connection of the session in the second communications network. Then, the access management network element sends a response message to the session management network element, and the response message includes the allocated second connection identifier. For example, the response message may be an EBI assignment response message. After receiving the second connection identifier, the session management network element sends a transmission message to the access management network element. The transmission message includes N1 session management information sent to the terminal device and N2 session management information sent to the access network device. The N1 session management information may be an N1 session management (SM) container. The N1 session management information includes the first connection identifier allocated by the session management network element, and the second connection identifier that corresponds to the first connection identifier and that is in the second communications network. The N2 session management information includes the first connection identifier allocated by the session management network element, and the second connection identifier that corresponds to the first connection identifier and that is in the second communications network. The access management network element sends an N2 session request to the access network device, and the request message includes a NAS message and the N2 session management information. The NAS message includes the N1 session management information. After receiving the request message, the access network device sends the N1 session management information to the terminal device. In a possible implementation, the NAS message may be a session establishment or modification accept message. After receiving the request message, the access network device sends the session establishment or modification accept message to the terminal device.

If the session management network element determines that the access technology type corresponding to the session is non-3GPP access, the session management network element skips sending the request message to the access management network element such that the access management network element does not allocate the second connection identifier to the connection of the session in the second communications network. Optionally, if the session management network element skips sending the connection identifier assignment request to the access management network element, the session management network element sends indication information to the user plane network element, and the indication information is used to indicate the user plane network element not to allocate tunnel information to the connection of the session in the second communications network. In this embodiment of this application, that the session management network element skips sending the request message to the access management network element may be understood as that the session management network element rejects sending the request message to the access management network element, or the session management network element does not trigger to send the request message to the access management network element.

In another possible implementation, alternatively, the access management network element may determine the access technology type corresponding to the session. The access management network element determines, based on the access technology type corresponding to the session, whether to allocate, in the second communications network, the second connection identifier to the session. For example, if the access management network element determines that the access technology type corresponding to the session is non-3GPP access, the access management network element does not allocate, in the second communications network, the second connection identifier to the session. If the access management network element determines that the access technology type corresponding to the session is 3GPP access, after receiving the request message from the session management network element, the access management network element allocates, in the second communications network, the second connection identifier to the session.

In this embodiment of this application, the session management network element determines, based on the access technology type corresponding to the session, whether to send a connection request message to the access management network element in the first communications network. If the access technology type corresponding to the session is non-3GPP access, the session management network element skips sending the connection identifier assignment request message to the access management network element such that the access management network element can skip allocating the connection identifier to the connection corresponding to the session in the second communications network. Because a quantity of connection identifiers that can be used for one session is limited, connection identifier resources can be saved in the method in this embodiment.

In a possible implementation, when the terminal device accesses the first communications network using the non-3GPP technology, the access management network element does not allocate, in the second communications network, the second connection identifier to the session. When the terminal device is in an idle state and needs to access the second communications network using the 3GPP technology, because there is no second connection identifier in the terminal device, the terminal device does not access the second communications network by initiating a TAU procedure. The terminal device may initiate, using the 3GPP technology, an attach procedure to access the second communications network. Further, an attach message sent by the terminal device includes handover indication information. According to the method in this embodiment, a problem that the terminal device fails to be handed over from the first communications network to the second communications network can be avoided.

In another possible implementation, the terminal device may access the first communications network using the non-3GPP access technology and the 3GPP access technology. The access management network element allocates, in the second communications network, a second connection identifier to a first session accessing the first communications network using the 3GPP technology. The access management network element does not allocate, in the second communications network, a second connection identifier to a second session accessing the first communications network using the non-3GPP technology. When the terminal device is in the idle state and needs to access the second communications network using the 3GPP technology, the terminal device first initiates the TAU procedure using context information of the first session in the second communications network. In this way, the terminal device can register with the second communications network. Then, the second session is changed, using a PDN connection establishment procedure, to a session that accesses the second communications network using the 3GPP technology. A PDN connection establishment request message in the PDN connection establishment procedure includes the handover indication information.

In this embodiment of this application, for details of the TAU procedure, the handover attach procedure, and the PDN connection establishment procedure, refer to descriptions in the existing 3GPP technology.

According to the method in the first embodiment of this application, when the session management network element determines that the access technology type corresponding to the session is non-3GPP access, the session management network element skips sending the request message to the access management network element. If the terminal device needs to access the first communications network using the 3GPP access technology, the access technology type of the session is changed from non-3GPP access to 3GPP access. For example, the terminal device may change the access technology type of the session from non-3GPP access to 3GPP access by initiating a service request procedure. In the service request procedure, the session management network element sends the request message to the access management network element in the first communications network. The request message is used to request the access management network element to allocate the second connection identifier of the session in the second communications network. The session management network element receives the second connection identifier allocated by the access management network element. The session management network element sends the connection identifier to the access network device and the terminal device. In a possible implementation, in the service request procedure, the session management network element may send the second connection identifier to the access network device and the terminal device using the session modification procedure. For example, the session modification procedure may be a PDU session modification procedure initiated by the network side. In another possible implementation, the session management network element may send the second connection identifier to the access network device and the terminal device in the existing service request procedure.

Figure 4:
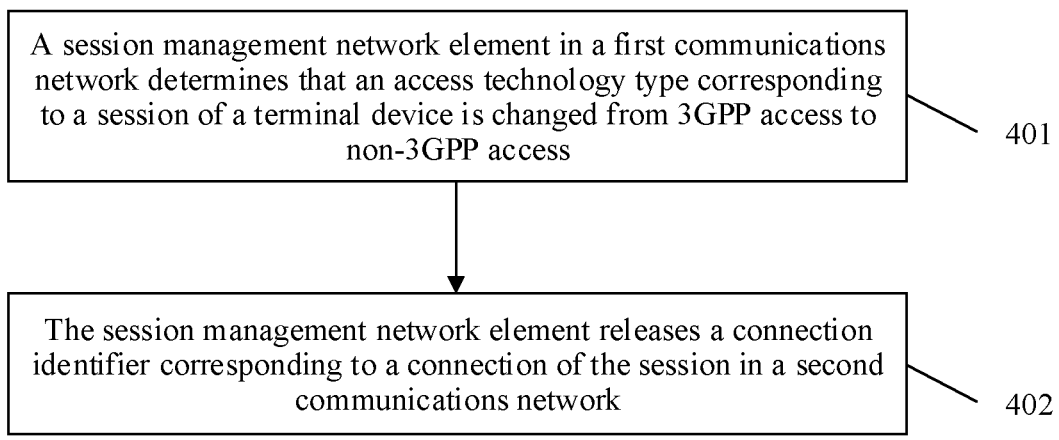
FIG. 4 is a schematic flowchart of a communications method according to a second embodiment of this application.

FIG. 4 is a schematic flowchart of a communications method according to a second embodiment of this application. The communications method relates to a procedure of releasing a second connection identifier when an access technology type corresponding to a session is changed from 3GPP access to non-3GPP access. The communications method includes the following steps.

401: A session management network element in a first communications network determines that an access technology type corresponding to a session of a terminal device is changed from 3GPP access to non-3GPP access.

In a possible implementation, the session management network element receives a session context establishment request message sent by an access management network element in the first communications network. The session management network element determines, based on the session context request message, that the access technology type corresponding to the session of the terminal device in the first communications network is changed from 3GPP access to non-3GPP access. For example, the session context establishment request message includes the access technology type corresponding to the session, which is non-3GPP access, and the access technology type that corresponds to the session and that is previously obtained by the session management network element is 3GPP access. In this case, the session management network element determines that the access technology type corresponding to the session is changed from 3GPP access to non-3GPP access.

402: The session management network element releases a connection identifier corresponding to a connection of the session in a second communications network.

Before the access technology type corresponding to the session is changed from 3GPP access to non-3GPP access, because the access technology type corresponding to the session is 3GPP access, the access management network element has allocated a second connection identifier to the connection of the session in the second communications network. Therefore, when the access technology type corresponding to the session is changed from 3GPP access to non-3GPP access, the session management network element releases the second connection identifier of the session in the second communications network.

In a possible implementation, the session management network element sends a notification message to the access management network element in the first communications network. The notification message is used to indicate the access management network element to release the second connection identifier of the session in the second communications network. Further, the notification message may be a session status notification (Session Status Notify). The notification message may include cause information for releasing the second connection identifier. For example, the cause information may be that the access technology is changed from 3GPP access to non-3GPP access. The notification message may include session status information. The session status information includes "release" or "handover". The access management network element may release the second connection identifier of the session in the second communications network based on the session status information. The session status information may also be understood as cause information for releasing the second connection identifier.

In another possible implementation, the session management network element may send the notification information to the access management network element using a message in an existing procedure. The notification message is used to indicate the access management network element to release the second connection identifier of the session in the second communications network. For example, the session management network element sends an EBI assignment message to the access management network element in the first communications network. The EBI assignment message includes a list of EBIs that need to be released. The message may further include an EBI release cause value, for example, "handover", or that the access technology is changed from 3GPP access to non-3GPP access. After receiving the EBI assignment message, the access management network element releases the second connection identifier of the session in the second communications network.

In still another possible implementation, the access management network element autonomously determines that the access technology type corresponding to the session of the terminal device is changed from 3GPP access to non-3GPP access. Then, the access management network element releases the second connection identifier of the session in the second communications network.

The access management network element may release all second connection identifiers of the session in the second communications network. The access management network element may alternatively release a part of second connection identifiers of the session in the second communications network. For example, the access management network element releases the EBIs included in the EBI assignment message.

The session management network element may further send first indication information to a user plane network element, and the first indication information is used to indicate the user plane network element to release tunnel information of the connection of the session in the second communications network. For example, the first indication information may be an EPS core network tunnel information revocation "EPS CN tunnel information revocation" indication.

The session management network element sends second indication information to the terminal device. The second indication information is used to indicate the terminal device to release the second connection identifier of the session in the second communications network. The second indication information may be the second connection identifier that needs to be released. For example, the second indication information may be an "EBI revocation list". In a possible implementation, the session management network element sends a transmission message to the access management network element. The transmission message includes N1 session management information sent to the terminal device. The N1 session management information includes the second connection identifier that needs to be released. The access management network element sends an N2 session request to an access network device, and the request message includes the N1 session management information. After receiving the request message, the access network device sends the N1 session management information to the terminal device. The N1 session management information includes the second connection identifier that needs to be released. After receiving the N1 session management information, the terminal device releases the second connection identifier of the session in the second communications network based on the N1 session management information.

In this embodiment of this application, when the access technology type corresponding to the session of the terminal device is changed from 3GPP access to non-3GPP access, the session management network element releases the second connection identifier of the session in the second communications network in time. This avoids a waste of communication resources.

In the method in this embodiment, when the session management network element in the first communications network determines that the access technology type corresponding to the session of the terminal device is changed from 3GPP access to non-3GPP access, the session management network element releases the connection identifier corresponding to the connection of the session in the second communications network. The session management network element may alternatively release, in another scenario, the connection identifier corresponding to the connection of the session in the second communications network. For example, when the session management network element determines that the terminal device changes from accessing the first communications network using the non-3GPP technology to accessing the second communications network using the 3GPP technology, the session management network element releases the connection identifier of the connection of the session in the second communications network. In this scenario, for a manner in which the session management network element releases the connection identifier of the connection of the session in the second communications network, refer to the description of step 402.

Figure 5:
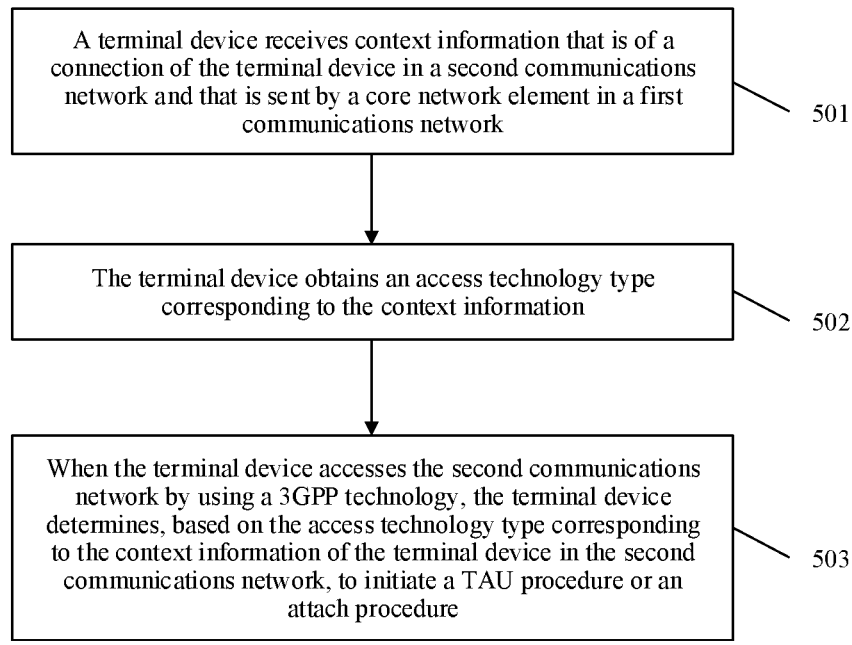
FIG. 5 is a schematic flowchart of a communications method according to a third embodiment of this application.

FIG. 5 is a schematic flowchart of a communications method according to a third embodiment of this application. In this embodiment, a terminal device accesses a first communications network using a non-3GPP technology. A session management network element in the first communications network requests to allocate a second connection identifier to a connection of a session in a second communications network. When the terminal device is in an idle state and needs to access the second communications network using a 3GPP technology, the terminal device determines, based on an access technology type corresponding to context information of the session, a manner of being handed over to the second communications network. The communications method includes the following steps.

501: The terminal device receives context information that is of the connection of the terminal device in the second communications network from a core network element in the first communications network.

When the terminal device accesses the first communications network using the non-3GPP technology, the terminal device receives, using the non-3GPP technology, the context information that is of the connection of the terminal device in the second communications network from the core network element in the first communications network.

In this embodiment of this application, the context information of the connection of the terminal device in the second communications network may be context information of all connections, or may be context information of a part of connections. The context information of the connection may be a second connection identifier.

In a possible implementation, the terminal device receives, using the non-3GPP technology, N1 session management information sent by an access management network element in the first communications network. The N1 session management information includes the context information of the connection of the terminal device in the second communications network. In another possible implementation, in a session establishment or session modification procedure, a session access technology type changing procedure, or a service request procedure, the terminal device receives the context information sent by the core network element.

After receiving the context information of the connection in the second communications network, the terminal device may store the context information.

502: The terminal device obtains an access technology type corresponding to the context information.

In a possible implementation, regardless of whether the access technology type corresponding to the session is 3GPP access or non-3GPP access, the session management network element requests to allocate the second connection identifier to the connection of the session in the second communications network.

The access technology type corresponding to the context information may be an access technology type corresponding to the session. Further, if the access technology type corresponding to the session is 3GPP access, the access technology type corresponding to the context information is 3GPP access. For example, if the context information is the second connection identifier, and the access technology type corresponding to the session is 3GPP access when the access management network element allocates the second connection identifier, the access technology type corresponding to the context information is 3GPP access. If the access technology type corresponding to the session is non-3GPP access, the access technology type corresponding to the context information is non-3GPP access. For example, if the context information is the second connection identifier, and the access technology type corresponding to the session is non-3GPP access when the access management network element allocates the second connection identifier, the access technology type corresponding to the context information is non-3GPP access.

In a possible implementation, the terminal device receives the access technology type that corresponds to the context information from the core network element. For example, when the terminal device receives the context information from the access management network element, the terminal device further receives the access technology type corresponding to the context information. In another possible implementation, the terminal device obtains the access technology type corresponding to the session in the session establishment or session modification procedure, the session access technology type changing procedure, or the service request procedure. The terminal device may determine the access technology type corresponding to the session as the access technology type corresponding to the context information. In still another possible implementation, the terminal device determines, based on an access type of the connection of the terminal device in the first communications network, the access technology type corresponding to the context information. The first connection of the terminal device in the first communications network corresponds to the second connection of the terminal device in the second communications network. For example, if the terminal device accesses a 5G core network using the non-3GPP technology, an access technology type corresponding to EPS context information of the terminal device is non-3GPP access.

When the access technology type corresponding to the context information or the access technology type corresponding to the session changes, the terminal device obtains a changed access technology type. For example, the terminal device stores the changed access technology type corresponding to the context information or the changed access technology type corresponding to the session.

503: When the terminal device accesses the second communications network using the 3GPP technology, the terminal device determines, based on the access technology type corresponding to the context information of the terminal device in the second communications network, to initiate a TAU procedure or an attach procedure.

If the terminal device is in the idle state and the terminal device needs to access the second communications network using the 3GPP technology, the terminal device initiates different procedures based on different access technology types corresponding to the context information of the terminal device in the second communications network.

Further, if the access technology type corresponding to the context information of the terminal device in the second communications network is 3GPP access, the terminal device initiates the TAU procedure.

If the access technology type corresponding to the context information of the terminal device in the second communications network is non-3GPP access, the terminal device initiates the attach procedure. An attach request message in the attach procedure includes handover indication information, and is used to indicate that the attach procedure is initiated due to a handover. In this embodiment of this application, the attach procedure in which the attach request message includes the handover indication information may also be referred to as a handover attach procedure. In a possible implementation, the attach request message may further include a PDN connection establishment request.

In a possible implementation, if the terminal device accesses the second communications network using the 3GPP technology, the terminal device sends indication information to the core network element, and the indication information is used to indicate the core network element to release the context information of the connection of the terminal device in the second communications network. For example, the indication information indicates the access management network element and/or the session management network element to release the second connection identifier of the terminal device in the second communications network. The indication information may be an "EBI revocation list". In another possible implementation, when the access management network element and/or the session management network element determine/determines that the terminal device changes from accessing the first communications network using the non-3GPP technology to accessing the second communications network using the 3GPP technology, the access management network element and/or the session management network element release/releases the connection identifier of the connection of the session in the second communications network. For details, refer to the description of the method in the second embodiment. Details are not described herein again.

The terminal device may alternatively release the context information of the connection of the terminal device in the second communications network. For example, the terminal device releases the second connection identifier of the terminal device in the second communications network.

In the method in this embodiment, if the terminal device is in the idle state and the terminal device needs to access the second communications network using the 3GPP technology, the terminal device initiates different procedures based on different access technology types corresponding to the context information of the terminal device in the second communications network. This can avoid a problem of a handover failure caused when the terminal device directly initiates the TAU procedure.

In this embodiment, an example in which the terminal device accesses the first communications network using the non-3GPP technology is used for description. However, this embodiment is not limited to this scenario. For example, the terminal device may access the first communications network using the non-3GPP technology and the 3GPP technology. The access management network element allocates, in the second communications network, a second connection identifier to a first session accessing the first communications network using the 3GPP technology. The access management network element allocates, in the second communications network, a second connection identifier to a second session accessing the first communications network using the non-3GPP technology. Correspondingly, the context information of the session in the terminal device includes two parts: first partial context information and second partial context information. An access technology type corresponding to the first partial context information is 3GPP access, and an access technology type corresponding to the second partial context information is non-3GPP access. In a possible implementation, when the terminal device is in the idle state and needs to access the second communications network using the 3GPP technology, the terminal device first initiates the TAU procedure using the first partial context information of the first session in the second communications network. In this way, the terminal device can register with the second communications network. Then, the terminal device changes, using a PDN connection establishment procedure, the second session to a session that accesses the second communications network using the 3GPP technology. A PDN connection establishment request message in the PDN connection establishment procedure includes the handover indication information. In another possible implementation, the terminal device separately initiates the TAU procedure and the handover attach procedure based on different access technology types corresponding to the context information. Further, the terminal device initiates the TAU procedure using the first partial context information of the first session in the second communications network, and the terminal device initiates the handover attach procedure using the second partial context information of the second session in the second communications network.

When the terminal device accesses the first communications network using the non-3GPP technology, although the access management network element allocates the connection identifier to the connection of the session in the second communications network, when the terminal device accesses the second communications network using the 3GPP technology, an access management network element (for example, an MIME) in the second communications network needs to reallocate an access identifier to the terminal device. Therefore, the session management network element in the first communications network needs to release the connection identifier allocated in the second communications network by the access management network element in the first communications network to the terminal device. In a possible implementation, after the terminal device initiates the TAU procedure and/or the handover attach procedure, the session management network element in the first communications network determines that the terminal device changes from accessing the first communications network using the non-3GPP technology to accessing the second communications network using the 3GPP technology. The session management network element releases the connection identifier of the connection of the session in the second communications network. For a specific manner in which the session management network element releases the connection identifier, refer to the description in the second embodiment of this application. Details are not described herein again.

Figure 6:
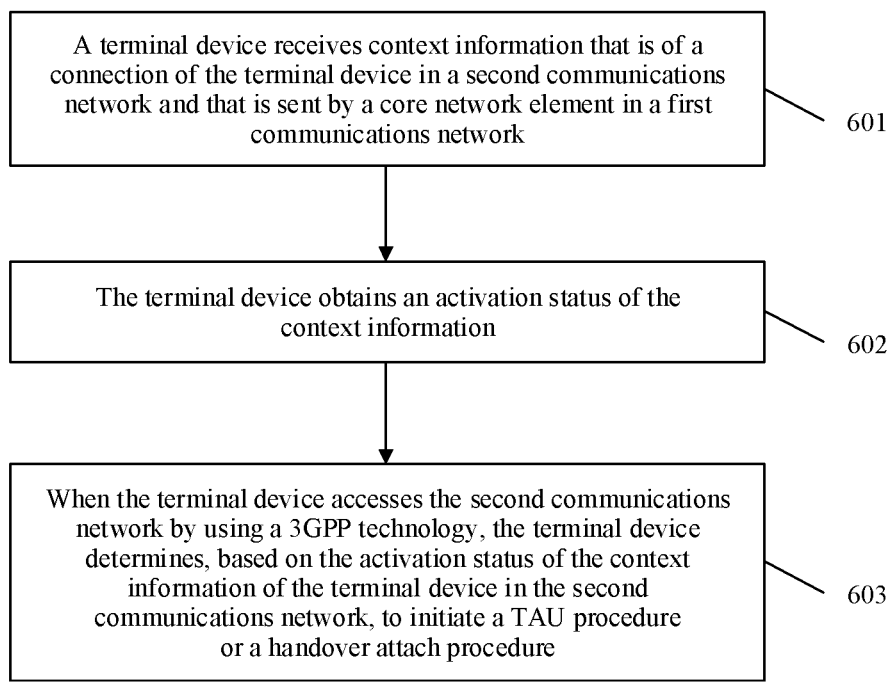
FIG. 6 is a schematic flowchart of a communications method according to a fourth embodiment of this application.

FIG. 6 is a schematic flowchart of a communications method according to a fourth embodiment of this application. In this embodiment, a terminal device accesses a first communications network using a non-3GPP technology. A session management network element in the first communications network requests to allocate a second connection identifier to a connection of a session in a second communications network. When the terminal device is in an idle state and needs to access the second communications network using a 3GPP technology, the terminal device determines, based on an activation status of context information, a manner of being handed over to the second communications network. Further, the communications method includes the following steps.

601: The terminal device receives the context information that is of the connection of the terminal device in the second communications network from a core network element in the first communications network.

For details, refer to the description of step 501.

602: The terminal device obtains an activation status of the context information.

For details about the activation status of the context information, refer to descriptions in an existing 3GPP protocol. Details are not described herein.

In a possible implementation, the terminal device accesses the first communications network using the non-3GPP technology. When the terminal device is in the idle state and needs to access the second communications network using the 3GPP technology, the terminal device records a state corresponding to the context information as an inactive state.

603: When the terminal device accesses the second communications network using the 3GPP technology, the terminal device determines, based on the activation status of the context information of the terminal device in the second communications network, to initiate a TAU procedure or a handover attach procedure.

Further, if the context information of the terminal device in the second communications network is in an active state, the terminal device initiates the TAU procedure. If all context information of the terminal device in the second communications network is in the inactive state, the terminal device initiates the handover attach procedure.

In this embodiment, an example in which the terminal device accesses the first communications network using the non-3GPP technology is used for description. However, this embodiment is not limited to this scenario. For example, the terminal device may access the first communications network using the non-3GPP technology and the 3GPP technology. An access management network element allocates, in the second communications network, a second connection identifier to a first session accessing the first communications network using the 3GPP technology. The access management network element allocates, in the second communications network, a second connection identifier to a second session accessing the first communications network using the non-3GPP technology. Correspondingly, the context information of the session in the terminal device includes two parts: first partial context information and second partial context information. The first partial context information is in the activate state, and the second partial context information is in the inactive state. In a possible implementation, when the terminal device is in the idle state and needs to access the second communications network using the 3GPP technology, the terminal device first initiates the TAU procedure using the first partial context information of the first session in the second communications network. Then, the terminal device changes, using a PDN connection establishment procedure, the second session to a session that accesses the second communications network using the 3GPP technology. A PDN connection establishment request message in the PDN connection establishment procedure includes handover indication information. In another possible implementation, the terminal device initiates the TAU procedure using the first partial context information of the first session in the second communications network, and the terminal device initiates the handover attach procedure using the second partial context information of the second session in the second communications network.

When the terminal device accesses the first communications network using the non-3GPP technology, although the access management network element allocates the connection identifier to the connection of the session in the second communications network, when the terminal device accesses the second communications network using the 3GPP technology, an access management network element (for example, an MIME) in the second communications network needs to reallocate an access identifier to the terminal device. Therefore, the session management network element in the first communications network needs to release the connection identifier allocated in the second communications network by the access management network element in the first communications network to the terminal device. In a possible implementation, after the terminal device initiates the TAU procedure and/or the handover attach procedure, the session management network element in the first communications network determines that the terminal device changes from accessing the first communications network using the non-3GPP technology to accessing the second communications network using the 3GPP technology. The session management network element releases the connection identifier of the connection of the session in the second communications network. For a specific manner in which the session management network element releases the connection identifier, refer to the description in the second embodiment of this application. Details are not described herein again.

This step is similar to step 503. For details, refer to the description of step 503.

The method in this embodiment is similar to the method in the third embodiment. For details, refer to the description of the method in the third embodiment.

In the following, communications methods in the embodiments of this application are described in detail using an example in which a terminal device is a UE, an access management network element is an AMF network element, a session management network element is an SMF network element, a user plane network element is a UPF network element, a first communications network is a 5G network, a second communications network is an EPS (4G) network, a connection of a PDU session in the second communications network is a bearer, a connection of the PDU session in the first communications network is a flow, a first connection identifier is a QFI, and a second connection identifier is an EBI.

Figure 7:
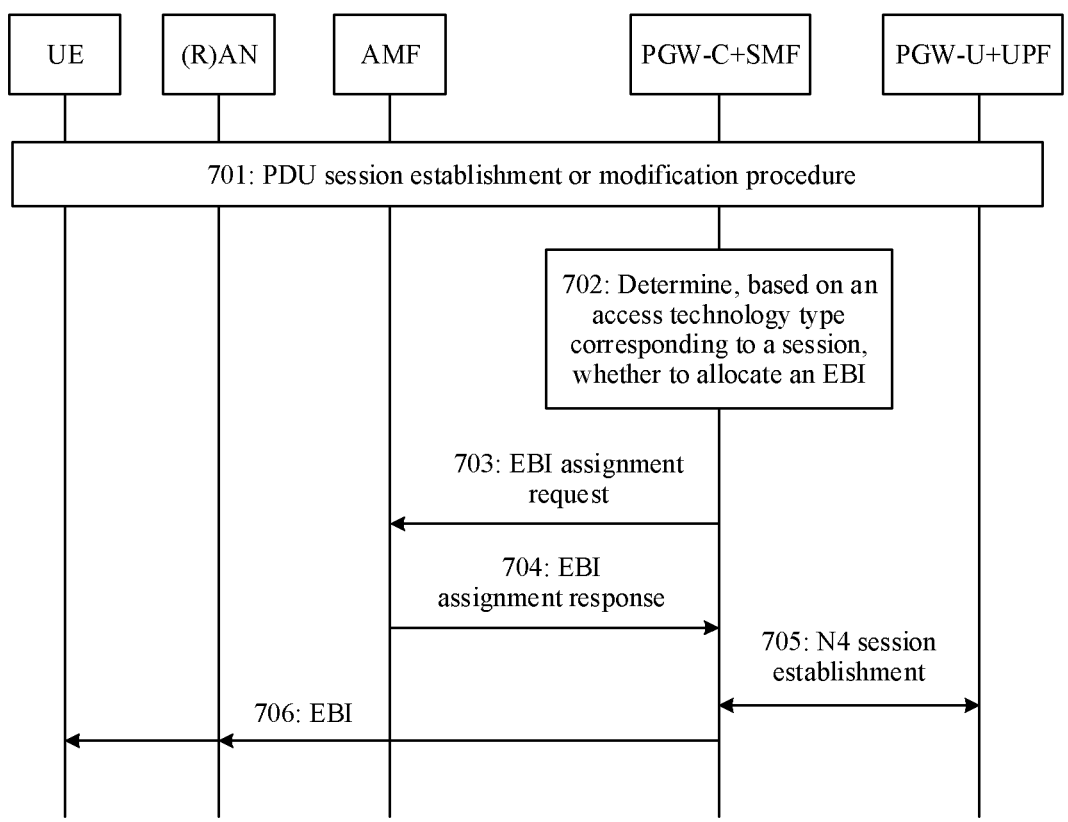
FIG. 7 is a schematic flowchart of a communications method according to a fifth embodiment of this application.

FIG. 7 is a schematic flowchart of a communications method according to a fifth embodiment of this application. The method in this embodiment is a detailed description of the method in the first embodiment. For details about similarities, refer to the method in the first embodiment. The communications method includes the following steps.

701: PDU session establishment or modification procedure.

The PDU session establishment procedure may be a session establishment procedure initiated by UE. The PDU session modification procedure may be a session modification procedure initiated by the UE or by a network side. The PDU session establishment or modification procedure may alternatively be a procedure in a process of handing over a PDU session from a non-3GPP side to a 3GPP side. For details, refer to descriptions in the existing 3GPP protocol. Details are not described herein.

702: An SMF network element determines, based on an access technology type corresponding to the session, whether to allocate an EBI.

In the PDU session establishment or modification procedure, the SMF determines whether to allocate an EBI to a QoS flow in the PDU session. In this case, an access technology corresponding to the PDU session needs to be considered. If the PDU session is established using a non-3GPP access technology, the SMF determines not to allocate the EBI. For a specific manner, refer to the description of step 302.

If the PDU session is established using a 3GPP access technology, the SMF determines to allocate the EBI, and then steps 703 to 706 are performed.

703: The SMF network element sends an EBI assignment request to an AMF network element.

704: The AMF network element sends an EBI assignment response to the SMF network element.

705: The SMF network element sends an N4 session establishment request to a UPF network element.

706: The SMF network element sends the EBI to an access network (AN) device and the UE through the AMF network element.

Further, the SMF network element sends an N1N2 transmission message (message transfer) to the AMF. The N1N2 transmission message includes N1 session management information and N2 session management information. The N1 session management information includes a QFI corresponding to the session and the EBI corresponding to the QFI. The N1 session management information may further include a session identifier (ID) and a QoS parameter that corresponds to the EBI. The N2 session management information includes the QFI corresponding to the session and the EBI corresponding to the QFI. The N2 session management information may further include the session identifier and the QoS parameter that corresponds to the EBI.

The AMF sends an N2 PDU session request to the access network device, and the PDU session request includes the N2 session management information and a NAS message. The NAS message includes the N1 session management information. The NAS message may be a PDU session establishment or modification accept message.

The access network device sends the PDU session establishment or modification accept message to the UE.

For details of 703 to 706, refer to a PDU session establishment or modification procedure in the existing 3GPP protocol. Details are not described herein.

Figure 8:
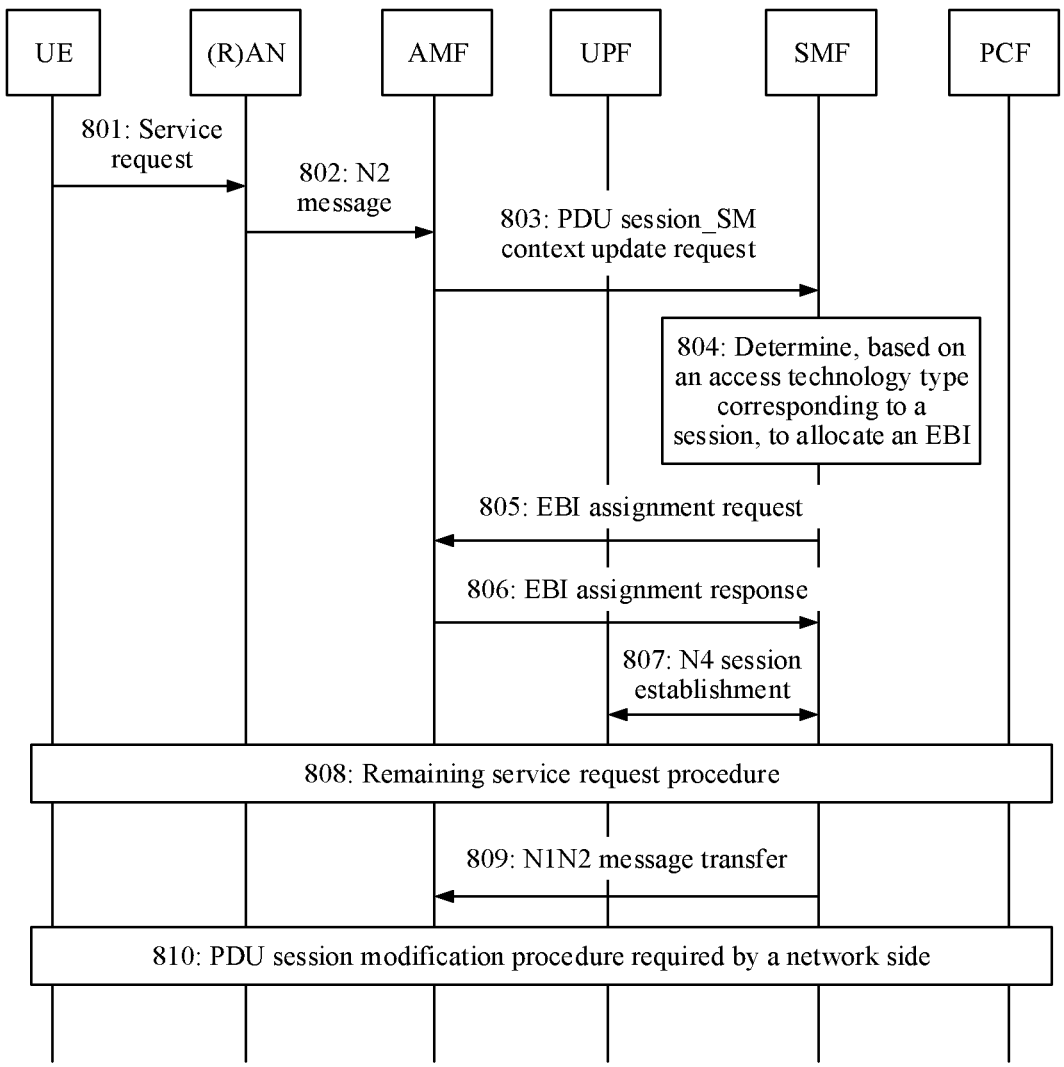
FIG. 8 is a schematic flowchart of a communications method according to a sixth embodiment of this application.

In the embodiment in FIG. 7, when the SMF network element determines that the access technology type corresponding to the session is non-3GPP access, the SMF network element skips sending the EBI assignment request message to the AMF network element. When the UE needs to access a 5G core network using the 3GPP access technology, the access technology type of the PDU session needs to be changed from non-3GPP access to 3GPP access. FIG. 8 is a schematic flowchart of a communications method according to a sixth embodiment of this application. In the communications method, a terminal device changes an access technology type of a PDU session from non-3GPP access to 3GPP access using a service request procedure. The communications method includes the following steps.

801: UE sends a service request message to an access network device.

The message may include an identifier of a session that allows to be changed from a non-3GPP access technology to a 3GPP access technology.

802: The access network device sends an N2 message to an AMF.

The N2 message includes the service request message.

803: The AMF network element sends a session management context update request of the PDU session to an SMF network element.

Further, the message may be an Nsmf_PDUSession_UpdateSMContext Request message.

For details about 801 to 803, refer to descriptions in the existing 3GPP protocol.

804: The SMF network element determines, based on an access technology type corresponding to the session, to allocate an EBI.

Because the session performs access using the 3GPP technology, the SMF network element needs to allocate an EBI to a QFI in the session.

805 to 807 are similar to 703 to 705. For details, refer to the descriptions of 703 to 705.

808: A network completes a remaining procedure of the service request.

For details, refer to descriptions in the existing 3GPP protocol.

809: The SMF network element sends an N1N2 transmission message (message transfer) to the AMF.

The N1N2 transmission message includes N1 session management information and N2 session management information. The N1 session management information includes the QFI corresponding to the session and the EBI corresponding to the QFI. The N1 session management information may further include a session identifier and a QoS parameter that corresponds to the EBI. The N2 session management information includes the QFI corresponding to the session and the EBI corresponding to the QFI. The N2 session management information may further include the session identifier and the QoS parameter that corresponds to the EBI.

810: Send the EBI to the terminal device and the access network device using a PDU session modification procedure required by the network side.

For example, the AMF sends an N2 PDU session request to the access network device, and the PDU session request includes the N2 session management information and a NAS message. The NAS message includes the N1 session management information. The NAS message may be a PDU session establishment or modification accept message.

The access network device sends the PDU session establishment or modification accept message to the UE.

For details about the PDU session modification procedure required by the network side, refer to descriptions in the existing 3GPP protocol.

In the communications method in the embodiment in FIG. 8, an EBI assignment procedure is introduced into the service request procedure, and the EBI is sent to the terminal device and the access network device using the PDU session modification procedure required by the network side such that the access technology type of the PDU session is changed from non-3GPP access to 3GPP access.

Figure 9:
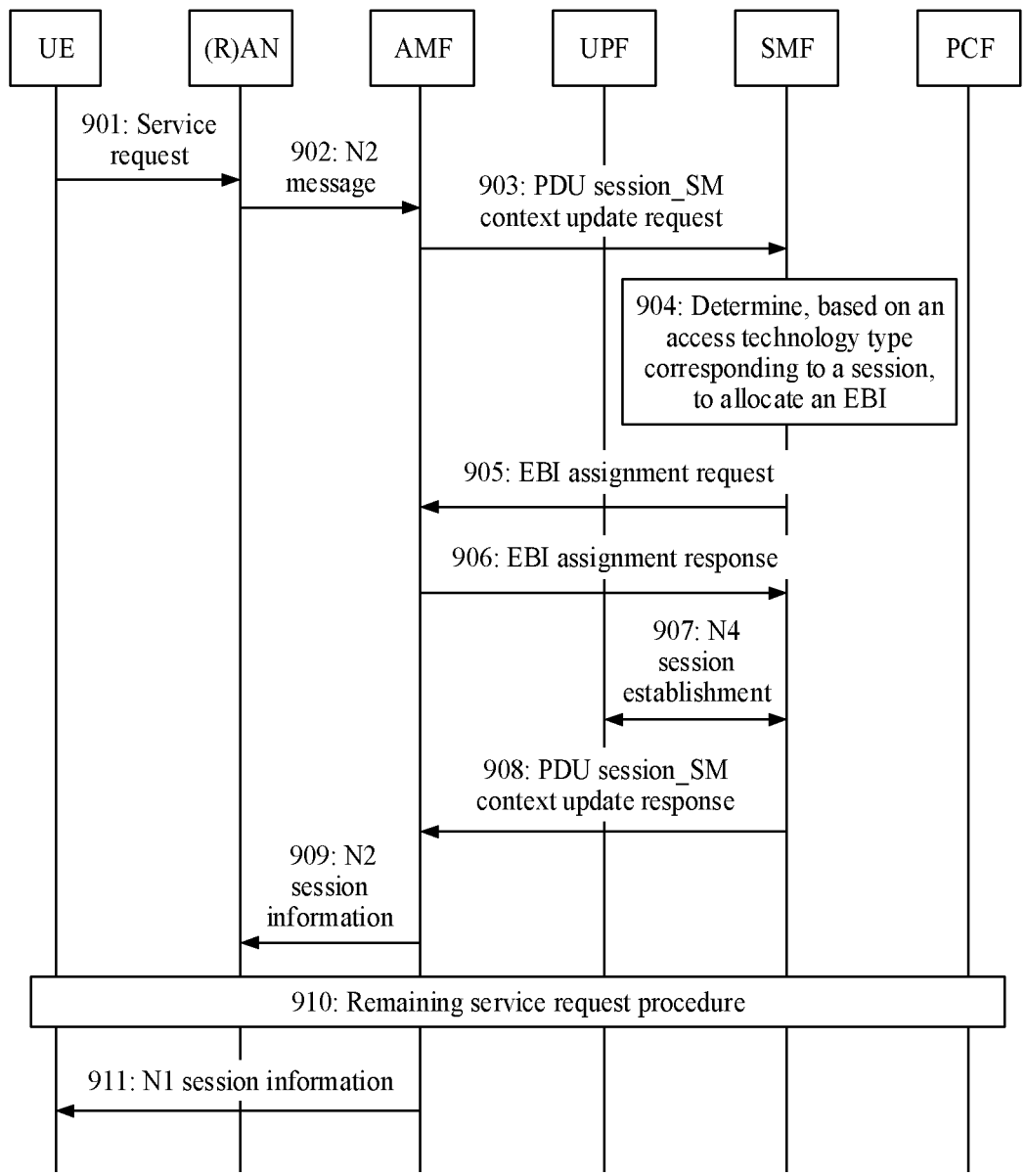
FIG. 9 is a schematic flowchart of a communications method according to a seventh embodiment of this application.

FIG. 9 is a schematic flowchart of a communications method according to a seventh embodiment of this application. The method in this embodiment is similar to the method in the embodiment in FIG. 8, and a difference lies in that the EBI allocated by the SMF network element is sent to the terminal device and the access network device using a message in the service request procedure. The communications method includes the following steps.

901 to 907 are similar to 801 to 807. For details, refer to the descriptions of 801 to 807.

908: The SMF network element sends a session management context update response message of the PDU session to the AMF network element.

Further, the message may be an Nsmf_PDUSession_UpdateSMContext Response message.

The message may include N1 session management information and N2 session management information. The N1 session management information includes a QFI corresponding to the session and the EBI corresponding to the QFI. The N1 session management information may further include a session identifier and a QoS parameter that corresponds to the EBI. The N2 session management information includes the QFI corresponding to the session and the EBI corresponding to the QFI. The N2 session management information may further include the session identifier and the QoS parameter that corresponds to the EBI.

909: The AMF sends an N2 session request to the access network device.

The PDU session request includes the N2 session management information.

910: A network completes a remaining procedure of the service request.

For details, refer to descriptions in other approaches.

911: The AMF network element sends the N1 session management information to the UE through the access network device.

The N1 session management information includes the QFI corresponding to the session and the EBI corresponding to the QFI. The N1 session management information may further include the session identifier and the QoS parameter that corresponds to the EBI.

For similarities between the method in this embodiment and the method in the sixth embodiment, refer to the description of the method in the sixth embodiment.

Figure 10:
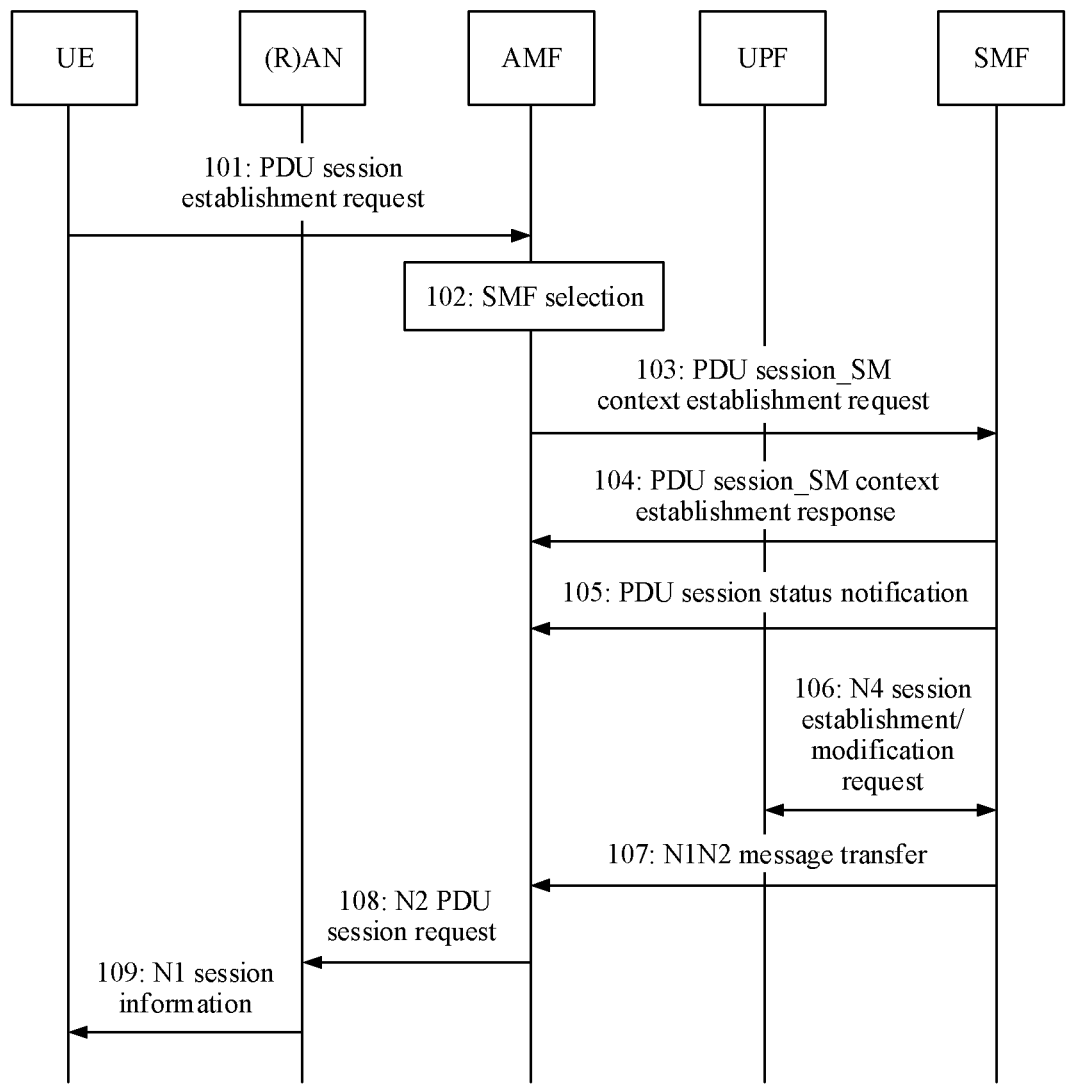
FIG. 10 is a schematic flowchart of a communications method according to an eighth embodiment of this application.

In this embodiment of this application, if the access technology type corresponding to the PDU session is changed from 3GPP access to non-3GPP access, the EBI allocated to the PDU session needs to be released. FIG. 10 is a schematic flowchart of a communications method according to an eighth embodiment of this application. This embodiment is a detailed description of the method in the second embodiment. For details about similarities, refer to the method in the second embodiment. The communications method includes the following steps.

101: UE sends a PDU session establishment request to an AMF network element using a non-3GPP technology.

In a possible implementation, the PDU session establishment request includes a handover indication and an identifier of a PDU session, and the handover indication is used to indicate that an access technology type of the PDU session needs to be changed. The handover indication may be "existing PDU session".

102: The AMF network element selects an SMF network element.

The AMF network element selects, based on the handover indication and the identifier of the PDU session, the SMF network element that serves the PDU session before the handover.

103: The AMF network element sends a session management context request message of the PDU session to the selected SMF network element.

Further, the message may be an Nsmf_PDUSession_CreateSMContext Request message.

In a possible implementation, the AMF network element determines that the access technology type of the PDU session is changed from 3GPP access to non-3GPP access. The AMF network element releases an EBI allocated to a QoS flow in the PDU session. The session management context request message may include the EBI that needs to be released.

104: The SMF network element sends a session management context response message of the PDU session to the AMF network element.

105: The SMF network element sends a PDU session status notification message to the AMF network element.

The PDU session status notification message may be an "Nsmf_PDUSession_StatusNotify" message.

In a possible implementation, after receiving the session management context request message of the PDU session, the SMF network element determines that the access technology type of the PDU session is changed from 3GPP access to non-3GPP access. The SMF network element releases the EBI corresponding to the QoS flow in the PDU session. In another possible implementation, the SMF network element receives the session management context request message of the PDU session in step 103, and releases the EBI included in the message.

In a possible implementation, the SMF network element sends the PDU session status notification message to the AMF network element. In a possible implementation, the notification message may include cause information for releasing the EBI. For example, the cause information may be that 3GPP access is changed to non-3GPP access. In another possible implementation, the notification message may include PDU session status information. The PDU session status information includes "release" or "handover". The PDU session status information may be used as the cause information for releasing the EBI. After receiving the notification message, the AMF network element releases the corresponding EBI.

In another possible implementation, the SMF network element may send an EBI assignment message to the AMF network element. The EBI assignment message includes a list of EBIs that need to be released. The message may further include an EBI release cause value, for example, "handover", or that the access technology is changed from 3GPP access to non-3GPP access. The AMF network element releases the corresponding EBI based on the EBI assignment message.

106: The SMF network element sends an N4 session establishment or modification request to a UPF network element.

The N4 session establishment or modification request includes indication information, and the indication information is used to indicate the UPF network element to release EPS core network (CN) tunnel information allocated to the QoS flow in the PDU session and a corresponding EPS QoS parameter.

After receiving the message, the UPF network element releases the EPS core network tunnel information corresponding to the QoS flow in the PDU session, and the EPS QoS parameter.

107: The SMF network element sends an N1N2 transmission message to the AMF network element.

Further, the N1N2 transmission message may be "Namf_N1N2MessageTransfer".

The N1N2 transmission message includes N1 session management information. The N1 session management information includes the EBI that needs to be released. For example, the EBI that needs to be released may be included in "EBI revocation list" information.

108: The AMF sends an N2 PDU session request message to a non-3GPP access network device.

The N2 PDU session request includes a NAS message. The NAS message includes N1 session management information. The N1 session management information includes the EBI that needs to be released. The NAS message may be a PDU session establishment accept message. In a possible implementation, the N1 session management information included in the message may be the N1 session management information received by the AMF network element from the SMF network element.

109: The non-3GPP access network device sends the PDU session establishment accept message to the UE.

The PDU session establishment accept message includes N1 session management information.

The N1 session management information may be the N1 session management information received by the non-3GPP access network device from the AMF network element. The N1 session management information includes the EBI that needs to be released.

After receiving the N1 session management information, the UE releases the EBI and the corresponding EPS QoS parameter.

Figure 11:
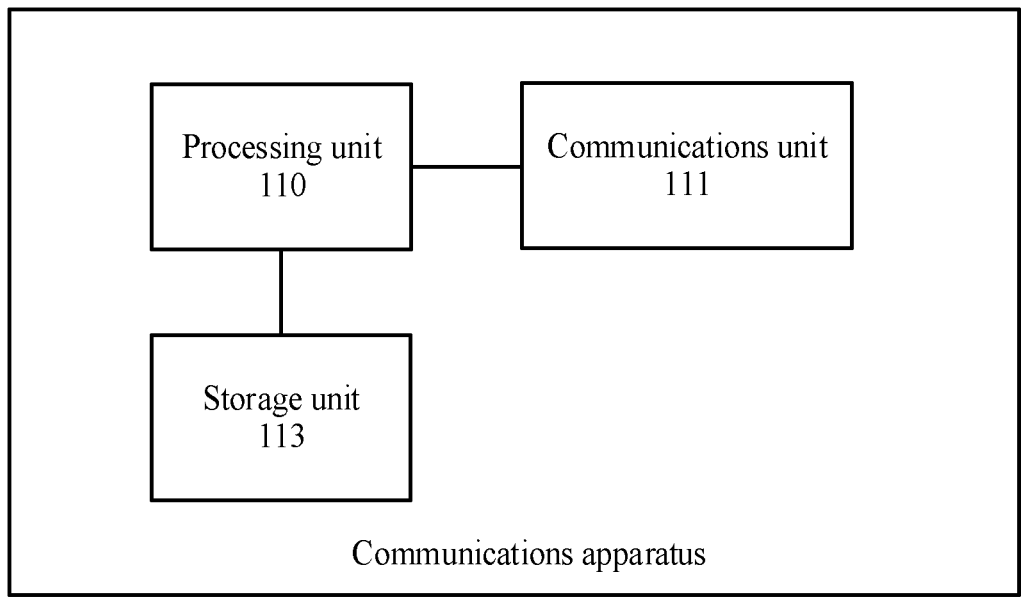
FIG. 11 is a schematic diagram of a communications apparatus according to an embodiment of this application.

FIG. 11 is a schematic diagram of a communications apparatus according to an embodiment of this application. For example, the communications apparatus may be the session management network element in the first embodiment, the second embodiment, or the fifth embodiment to the eighth embodiment of this application. The communications apparatus may alternatively be a chip or a chip system in the session management apparatus.

Further, the communications apparatus includes a processing unit 110, a communications unit 111, and a storage unit 113. The processing unit 110, the communications unit 111, and the storage unit 113 may be physically separated units, or may be integrated into one or more physical units. This is not limited herein.

The communications unit 111 is configured to implement content exchange between the processing unit 110 and another unit or network element. Further, the communications unit may be a transceiver circuit or a transceiver. The communications unit 111 may alternatively be a communications interface of the communications apparatus. For example, when the communications apparatus is the session management network element, the communications unit 111 may be the N11 interface in FIG. 1 or FIG. 2. In a possible implementation, the communications unit 111 may be integrated into the processing unit 110. For example, the communications unit 111 is a communications interface or a transceiver circuit of the processing unit 110. Although only one communications unit 111 is shown in FIG. 11, the communications apparatus may alternatively include a plurality of communications units 111.

The processing unit 110 is configured to implement data processing by the communications apparatus. The processing unit 110 may be a processing circuit or may be a processor. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof.

Although only one processing unit 110 is shown in FIG. 11, the communications apparatus may alternatively include a plurality of processing units, or the processing unit 110 includes a plurality of processing subunits. Further, the processor may be a single-core processor (single-core CPU), or may be a multi-core processor (multi-core CPU).

The storage unit 113 is configured to store a computer instruction executed by the processing unit 110. The storage unit 113 may be a storage circuit or may be a memory. The memory may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM), used as an external cache.

The storage unit 113 may be a unit independent of the processing unit 110, or may be a storage unit in the processing unit 110. This is not limited herein. Although only one storage unit 113 is shown in FIG. 11, the communications apparatus may alternatively include a plurality of storage units 113, or the storage unit 113 includes a plurality of storage subunits.

In the embodiments of this application, the processing unit 110 may exchange content with another network element through the communications unit 111. For example, the processing unit 110 obtains or receives content from the other network element.

In a possible implementation, the processing unit 110, the communications unit 111, and the storage unit 113 may be connected to each other using a bus. The bus may be a Peripheral Component Interconnect (PCI) bus, an Extended Industry Standard Architecture (EISA) bus, or the like. The bus may be classified into an address bus, a data bus, a control bus, or the like.

In a first scenario, for example, when the communications apparatus is the session management network element in the first embodiment and the fifth embodiment to the seventh embodiment of this application, the communications unit 111 is configured to receive a message for requesting to establish or modify a session. The processing unit 110 is configured to determine, based on an access technology type corresponding to the session, whether to send a request message to an access management network element in the first communications network. The request message is used to request the access management network element to allocate a connection identifier of a connection of the session in a second communications network.

In the first scenario, the processing unit 110, the communications unit 111, and the storage unit 113 implement the following functions.

In a possible implementation, the processing unit 110 is configured to determine that the access technology type corresponding to the session is non-3GPP access, and determine to skip sending the request message to the access management network element.

In a possible implementation, the communications unit 111 is further configured to receive the access technology type that corresponds to the session from the access management network element.

In a possible implementation, the processing unit 110 is further configured to determine, in a service request process, that the access technology type corresponding to the session is changed from non-3GPP access to 3GPP access, and the communications unit 111 is further configured to send the request message to the access management network element, and receive the connection identifier that is of the connection of the session in the second communications network from the access management network element.

In a possible implementation, the communications unit 111 is further configured to send the connection identifier of the connection of the session in the second communications network to an access network device and a terminal device.

In a possible implementation, the communications unit 111 is configured to send the connection identifier of the connection of the session in the second communications network to the access network device and the terminal device using a session modification procedure.

In this embodiment of this application, the processing unit 110 enables, according to computer instructions stored in the storage unit 113, the communications apparatus to implement operations of the session management network element in the first embodiment and the fifth embodiment to the seventh embodiment of this application.

Further, the computer instructions stored in the storage unit 113 enable the processing unit 110 to implement the following operations of receiving, through the communications unit 111, a message for requesting to establish or modify a session, and determining, based on an access technology type corresponding to the session, whether to send a request message to an access management network element in the first communications network through the communications unit 111, where the request message is used to request the access management network element to allocate a connection identifier of a connection of the session in a second communications network.

In a possible implementation, determining, based on an access technology type corresponding to the session, whether to send a request message to an access management network element in the first communications network includes determining that the access technology type corresponding to the session is non-3rd generation partnership project 3GPP access, and skipping sending the request message to the access management network element.

In a possible implementation, the operations further include receiving, through the communications unit 111, the access technology type that corresponds to the session from the access management network element.

In a possible implementation, the operations further include determining, in a service request process, that the access technology type corresponding to the session is changed from non-3GPP access to 3GPP access, sending the request message to the access management network element through the communications unit 111, and receiving, through the communications unit 111, the connection identifier that is of the connection of the session in the second communications network from the access management network element.

In a possible implementation, the operations further include sending the connection identifier of the connection of the session in the second communications network to an access network device and a terminal device through the communications unit 111.

In a possible implementation, sending the connection identifier of the connection of the session in the second communications network to an access network device and a terminal device through the communications unit 111 includes sending, through the communications unit 111, the connection identifier of the connection of the session in the second communications network to the access network device and the terminal device using a session modification procedure.

In a second scenario, for example, when the communications apparatus is the session management network element in the second embodiment and the eighth embodiment of this application, the processing unit 110 is configured to determine that an access technology type corresponding to a session of a terminal device is changed from 3GPP access to non-3GPP access, and the processing unit 110 is further configured to release a connection identifier of a connection of the session in a second communications network.

In a third scenario, the processing unit 110 is configured to determine that a terminal device changes from accessing the first communications network using a non-3GPP technology to accessing a second communications network using a 3GPP technology, and the processing unit 110 is further configured to release a connection identifier of a connection of a session in the second communications network.

In the second scenario and the third scenario, the processing unit 110, the communications unit 111, and the storage unit 113 implement the following functions.

In a possible implementation, the communications unit 111 is configured to send a notification message to an access management network element in the first communications network, where the notification message is used to indicate the access management network element to release the connection identifier of the connection of the session in the second communications network.

In a possible implementation, the notification message includes cause information for releasing the connection identifier.

In a possible implementation, the notification message includes status information of the session. The status information of the session includes "release" or "handover".

In a possible implementation, the communications unit 111 is further configured to receive a session context establishment request message sent by the access management network element in the first communications network, and the processing unit 110 is configured to determine, based on the session context establishment request message, that the access technology type corresponding to the session of the terminal device is changed from 3GPP access to non-3GPP access.

In a possible implementation, the communications unit 111 is further configured to send first indication information to a user plane network element, where the first indication information is used to indicate the user plane network element to release tunnel information of the connection of the session in the second communications network.

In a possible implementation, the communications unit 111 is further configured to send second indication information to the terminal device, where the second indication information is used to indicate the terminal device to release the connection identifier of the connection of the session in the second communications network.

In this embodiment of this application, the processing unit 110 enables, according to computer instructions stored in the storage unit 113, the communications apparatus to implement operations of the session management network element in the second embodiment and the eighth embodiment of this application.

For example, the computer instructions stored in the storage unit 113 enable the processing unit 110 to implement the following operations determining that an access technology type corresponding to a session of a terminal device is changed from 3GPP access to non-3GPP access, and releasing a connection identifier of a connection of the session in a second communications network.

For another example, the computer instructions stored in the storage unit 113 enable the processing unit 110 to implement the following operations of determining that a terminal device changes from accessing the first communications network using a non-3GPP technology to accessing a second communications network using a 3GPP technology, and releasing a connection identifier of a connection of the session in the second communications network.

In a possible implementation, the operations further include sending a notification message to an access management network element in the first communications network through the communications unit 111, where the notification message is used to indicate the access management network element to release the connection identifier of the connection of the session in the second communications network.

In a possible implementation, the notification message includes cause information for releasing the connection identifier.

In a possible implementation, the notification message includes status information of the session. The status information of the session includes "release" or "handover".

In a possible implementation, the operations further include receiving, through the communications unit 111, a session context establishment request message sent by the access management network element in the first communications network, and determining that an access technology type corresponding to a session of a terminal device is changed from 3GPP access to non-3GPP access includes determining, based on the session context establishment request message, that the access technology type corresponding to the session of the terminal device is changed from 3GPP access to non-3GPP access.

In a possible implementation, the operations further include sending first indication information to a user plane network element through the communications unit 111, where the first indication information is used to indicate the user plane network element to release tunnel information of the connection of the session in the second communications network.

In a possible implementation, the operations further include sending second indication information to the terminal device through the communications unit 111, where the second indication information is used to indicate the terminal device to release the connection identifier of the connection of the session in the second communications network.

In this embodiment, an example in which the communications apparatus is the session management network element is used for description. The communications apparatus may alternatively be another core network element in the embodiments of this application, for example, an AMF network element.

Figure 12:
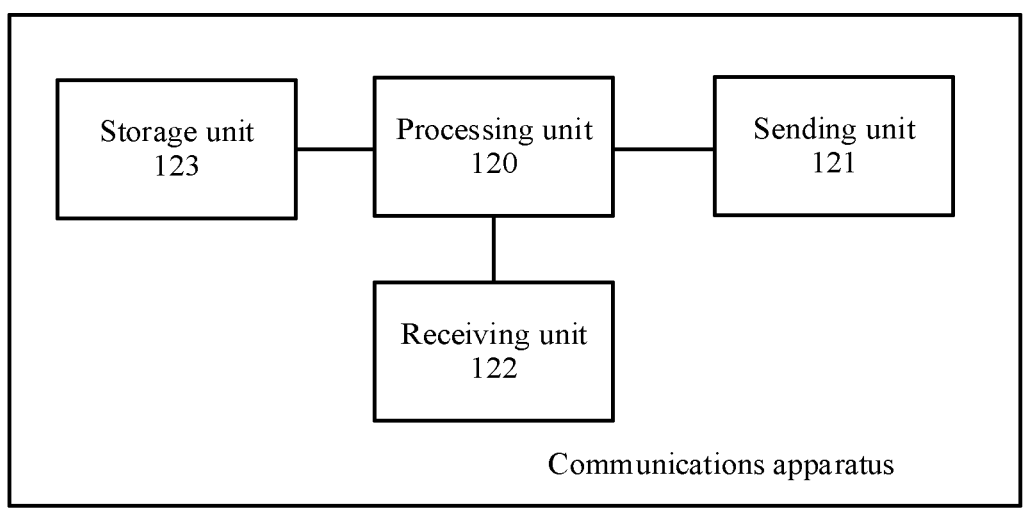
FIG. 12 is a schematic diagram of another communications apparatus according to an embodiment of this application.

FIG. 12 is a schematic diagram of another communications apparatus according to an embodiment of this application. For example, the communications apparatus may be the terminal device in the first embodiment to the eighth embodiment. The communications apparatus may alternatively be a chip or a chip system in the terminal device.

Further, the communications apparatus includes a processing unit 120, a sending unit 121, a receiving unit 122, and a storage unit 123. The processing unit 120, the sending unit 121, the receiving unit 122, and the storage unit 123 may be physically separated units, or may be integrated into one or more physical units. This is not limited herein.

The sending unit 121 and the receiving unit 122 are configured to implement content exchange between the processing unit 120 and another unit or network element. Further, the sending unit 121 may be a transmit circuit or a transmitter. The receiving unit 122 may be a receiving circuit or a receiver. The sending unit 121 and the receiving unit 122 may alternatively be a transceiver of the communications apparatus. The sending unit 121 and the receiving unit 122 may alternatively be a communications interface or a transceiver circuit of the processing unit 120. In a possible implementation, the sending unit 121 and the receiving unit 122 are one transceiver chip.

Although only one sending unit 121 and one receiving unit 122 are shown in FIG. 12, the communications apparatus may alternatively include a plurality of sending units 121 and a plurality of receiving units 122. The sending unit 121 and the receiving unit 122 may alternatively be subunits of a transceiver unit.

The processing unit 120 is configured to implement data processing by the communications apparatus. The processing unit 120 may be a processing circuit or may be a processor. The processor may be a CPU, an NP, or a combination of a CPU and an NP. The processor may further include a hardware chip. The hardware chip may be an ASIC, a PLD, or a combination thereof. The PLD may be a CPLD, an FPGA, a GAL, or any combination thereof.

Although only one processing unit 120 is shown in FIG. 12, the communications apparatus may alternatively include a plurality of processing units, or the processing unit 120 includes a plurality of processing subunits. Further, the processor may be a single-core processor, or may be a multi-core processor.

The storage unit 123 is configured to store a computer instruction executed by the processing unit 120. The storage unit 123 may be a storage circuit or may be a memory. The memory may be a volatile memory or a nonvolatile memory, or may include a volatile memory and a nonvolatile memory. The nonvolatile memory may be a ROM, a PROM, an EPROM, an EEPROM, or a flash memory. The volatile memory may be a RAM, used as an external cache.

The storage unit 123 may be a unit independent of the processing unit 120, or may be a storage unit in the processing unit 120. This is not limited herein. Although only one storage unit 123 is shown in FIG. 12, the communications apparatus may alternatively include a plurality of storage units 123, or the storage unit 123 includes a plurality of storage subunits.

In the embodiments of this application, the processing unit 120 may exchange content with another network element through the sending unit 121 and the receiving unit 122. For example, the processing unit 120 obtains or receives content from the other network element.

In a possible implementation, the processing unit 120, the sending unit 121, the receiving unit 122, and the storage unit 123 may be connected to each other using a bus. The bus may be a PCI bus, an EISA bus, or the like. The bus may be classified into an address bus, a data bus, a control bus, and the like.

In a scenario, for example, when the communications apparatus is the terminal device in the third embodiment of this application, the receiving unit 122 is configured to receive context information that is of a connection of the terminal device in a second communications network from a core network element in a first communications network, the processing unit 120 is configured to obtain an access technology type corresponding to the context information, and the processing unit 120 is further configured to determine that the terminal device accesses the second communications network using a 3GPP technology, and determine, based on the access technology type corresponding to the context information, to initiate a TAU procedure or an attach procedure, where an attach request in the attach procedure includes handover indication information.

In a possible implementation, the processing unit 120 is configured to receive, through the receiving unit, the access technology type that corresponds to the context information from the core network element.

In a possible implementation, the processing unit 120 is configured to obtain the access technology type corresponding to the context information, based on an access technology type of a connection of the terminal device in the first communications network, where the connection of the terminal device in the first communications network corresponds to the connection of the terminal device in the second communications network.

In a possible implementation, the processing unit 120 is configured to determine that the access technology type corresponding to the context information of the terminal device in the second communications network is 3GPP access, and initiate the TAU procedure.

In a possible implementation, the processing unit 120 is configured to determine that the access technology type corresponding to the context information of the terminal device in the second communications network is non-3GPP access, and initiate the attach procedure.

In a possible implementation, the sending unit 121 is configured to send indication information to the core network element in a process of initiating the attach procedure, where the indication information is used to indicate the core network element to release the context information of the connection of the terminal device in the second communications network.

In a possible implementation, the context information of the terminal device in the second communications network includes first partial context information and second partial context information, an access technology type corresponding to the first partial context information is 3GPP access, an access technology type corresponding to the second partial context information is non-3GPP access, and the processing unit 120 is configured to initiate the TAU procedure using the first partial context information, and change, using a PDN establishment procedure, a session corresponding to the second partial context information to a session that accesses the second communications network using a 3GPP technology.

In a possible implementation, the context information of the terminal device in the second communications network includes first partial context information and second partial context information, an access technology type corresponding to the first partial context information is 3GPP access, an access technology type corresponding to the second partial context information is non-3GPP access, and the processing unit 120 is configured to initiate the TAU procedure using the first partial context information, and initiate the attach procedure using the second partial context information.

In a possible implementation, the terminal device accesses the first communications network using a first session of the 3GPP technology, the terminal device accesses the first communications network using a second session of a non-3GPP technology, an access technology type corresponding to context information of a connection of the first session in the second communications network is 3GPP access, and the processing unit 120 is configured to initiate the TAU procedure using the context information, and change, using a PDN establishment procedure, the second session to a session that accesses the second communications network using the 3GPP technology.

In a possible implementation, the processing unit 120 is further configured to release the context information of the connection of the terminal device in the second communications network.

In this embodiment of this application, the processing unit 120 enables, according to the computer instructions stored in the storage unit 123, the communications apparatus to implement operations of the terminal device in the first embodiment to the eighth embodiment of this application.

For example, the computer instructions stored in the storage unit 123 enable the processing unit 120 to implement the following operations of receiving, through the receiving unit 122, context information that is of a connection of the terminal device in a second communications network from a core network element in a first communications network, obtaining an access technology type corresponding to the context information, and when the terminal device accesses the second communications network using a 3GPP technology, determining, based on the access technology type corresponding to the context information, to initiate a TAU procedure or an attach procedure, where an attach request in the attach procedure includes handover indication information.

In a possible implementation, obtaining an access technology type corresponding to the context information includes receiving, through the receiving unit 122, the access technology type that corresponds to the context information from the core network element.

In a possible implementation, obtaining an access technology type corresponding to the context information includes obtaining the access technology type corresponding to the context information, based on an access technology type of a connection of the terminal device in the first communications network, where the connection of the terminal device in the first communications network corresponds to the connection of the terminal device in the second communications network.

In a possible implementation, determining, based on the access technology type corresponding to the context information, to initiate a TAU procedure or an attach procedure includes initiating the TAU procedure if the access technology type corresponding to the context information of the terminal device in the second communications network is 3GPP access.

In a possible implementation, determining, based on the access technology type corresponding to the context information, to initiate a TAU procedure or an attach procedure includes initiating the attach procedure if the access technology type corresponding to the context information of the terminal device in the second communications network is non-3GPP access.

In a possible implementation, the operations further include sending, through the sending unit 121, indication information to the core network element in a process in which the terminal device initiates the attach procedure, where the indication information is used to indicate the core network element to release the context information of the connection of the terminal device in the second communications network.

In a possible implementation, the context information of the terminal device in the second communications network includes first partial context information and second partial context information, an access technology type corresponding to the first partial context information is 3GPP access, an access technology type corresponding to the second partial context information is non-3GPP access, and determining, based on the access technology type corresponding to the context information, to initiate a TAU procedure or an attach procedure includes initiating the TAU procedure using the first partial context information, and changing, using a PDN establishment procedure, a session corresponding to the second partial context information to a session that accesses the second communications network using the 3GPP technology.

In a possible implementation, the context information of the terminal device in the second communications network includes first partial context information and second partial context information, an access technology type corresponding to the first partial context information is 3GPP access, an access technology type corresponding to the second partial context information is non-3GPP access, and determining, based on the access technology type corresponding to the context information, to initiate a TAU procedure or an attach procedure includes initiating the TAU procedure using the first partial context information, and initiating the attach procedure using the second partial context information.

In a possible implementation, the terminal device accesses the first communications network using a first session of the 3GPP technology, the terminal device accesses the first communications network using a second session of a non-3GPP technology, an access technology type corresponding to context information of a connection of the first session in the second communications network is 3GPP access, and determining, based on the access technology type corresponding to the context information, to initiate a TAU procedure or an attach procedure includes initiating, by the terminal device, the TAU procedure using the context information, and changing, using a PDN establishment procedure, the second session to a session that accesses the second communications network using the 3GPP technology.

In a possible implementation, the operations further include releasing the context information of the connection of the terminal device in the second communications network.

In another scenario, for example, when the communications apparatus is the terminal device in the fourth embodiment of this application, the receiving unit 122 is configured to receive context information that is of a connection of the terminal device in a second communications network from a core network element in a first communications network, the processing unit 120 is configured to obtain an activation status of the context information, and the processing unit 120 is further configured to determine that the terminal device accesses the second communications network using a 3GPP technology, and determine, based on the activation status of the context information, to initiate a TAU procedure or an attach procedure, where an attach request in the attach procedure includes handover indication information.

In a possible implementation, the processing unit 120 is configured to determine that the context information of the terminal device in the second communications network is in an active state, and initiate the TAU procedure.

In a possible implementation, the processing unit 120 is configured to determine that the context information of the terminal device in the second communications network is in an inactive state, and initiate the attach procedure.

In a possible implementation, the context information of the terminal device in the second communications network includes first partial context information and second partial context information, the first partial context information is in the active state, the second partial context information is in the inactive state, and the processing unit 120 is configured to initiate the TAU procedure using the first partial context information, and change, using a PDN establishment procedure, a session corresponding to the second partial context information to a session that accesses the second communications network using the 3GPP technology.

In a possible implementation, the context information of the terminal device in the second communications network includes first partial context information and second partial context information, the first partial context information is in the active state, the second partial context information is in the inactive state, and the processing unit 120 is configured to initiate the TAU procedure using the first partial context information, and initiate the attach procedure using the second partial context information.

In a possible implementation, the terminal device accesses the first communications network using a first session of the 3GPP technology, the terminal device accesses the first communications network using a second session of a non-3GPP technology, context information of a connection of the first session in the second communications network is in the active state, and the processing unit 120 is configured to initiate the TAU procedure using the context information, and change, using a PDN establishment procedure, the second session to a session that accesses the second communications network using the 3GPP technology.

In this embodiment of this application, the processing unit 120 enables, according to the computer instructions stored in the storage unit 123, the communications apparatus to implement operations of the terminal device in the first embodiment to the eighth embodiment of this application.

For example, the computer instructions stored in the storage unit 123 enable the processing unit 120 to implement the following operations of receiving, through the receiving unit 122, context information that is of a connection of a terminal device in a second communications network from a core network element in a first communications network, obtaining an activation status of the context information, and when the terminal device accesses the second communications network using a 3GPP technology, determining, based on the activation status of the context information, to initiate a TAU procedure or an attach procedure, where an attach request in the attach procedure includes handover indication information.

In a possible implementation, determining, based on the activation status of the context information, to initiate a TAU procedure or an attach procedure includes initiating the TAU procedure if the context information of the terminal device in the second communications network is in an active state.

In a possible implementation, determining, based on the activation status of the context information, to initiate a TAU procedure or an attach procedure includes initiating the attach procedure if the context information of the terminal device in the second communications network is in an inactive state.

In a possible implementation, the context information of the terminal device in the second communications network includes first partial context information and second partial context information, the first partial context information is in the active state, the second partial context information is in the inactive state, and determining, based on the activation status of the context information, to initiate a TAU procedure or an attach procedure includes initiating the TAU procedure using the first partial context information, and changing, using a PDN establishment procedure, a session corresponding to the second partial context information to a session that accesses the second communications network using the 3GPP technology.

In a possible implementation, the context information of the terminal device in the second communications network includes first partial context information and second partial context information, the first partial context information is in the active state, the second partial context information is in the inactive state, and determining, based on the activation status of the context information, to initiate a TAU procedure or an attach procedure includes initiating the TAU procedure using the first partial context information, and initiating the attach procedure using the second partial context information.

In a possible implementation, the terminal device accesses the first communications network using a first session of the 3GPP technology, the terminal device accesses the first communications network using a second session of a non-3GPP technology, context information of a connection of the first session in the second communications network is in the active state, and determining, based on the activation status of the context information, to initiate a TAU procedure or an attach procedure includes initiating the TAU procedure using the context information, and changing, using a PDN establishment procedure, the second session to a session that accesses the second communications network using the 3GPP technology.

An embodiment of this application provides a computer storage medium. The computer storage medium stores a computer executable instruction. A device (which may be a single-chip microcomputer, a chip, or the like) or a processor may invoke the computer executable instruction stored in the readable storage medium to perform operations performed by the terminal device, the session management network element, or the access management network element in the methods in the first embodiment to the eighth embodiment.

An embodiment of this application provides a computer program product. The computer program product includes a computer executable instruction, and the computer executable instruction is stored in a computer readable storage medium. At least one processor of a device may read the computer executable instruction from the computer readable storage medium, and the at least one processor executes the computer executable instruction, to enable the device to perform operations performed by the terminal device, the session management network element, or the access management network element in the methods in the first embodiment to the eighth embodiment.

In the embodiments of this application, for ease of understanding, a plurality of examples is used for description. However, these examples are merely examples, and it does not mean that these examples are optimal implementations for implementing this application.

In the embodiments of this application, for ease of description, a session request message, an N1N2 message, a notification message, a configuration update command, and various other message names are used. However, these messages are merely used as examples to describe content that needs to be carried or an implemented function. Specific names of the messages constitute no limitation on this application. For example, the messages may be a first message, a second message, and a third message. These messages may be some specific messages, or may be some fields in the messages. These messages may alternatively represent various service operations.

In the embodiments of this application, for ease of understanding, a plurality of examples is used for description. However, these examples are merely examples, and it does not mean that these examples are optimal implementations for implementing this application.

In the embodiments of this application, for ease of description, a request message, a response message, and various other message names are used. However, these messages are merely used as examples to describe content that needs to be carried or an implemented function. Specific names of the messages constitute no limitation on this application. For example, the messages may be a first message, a second message, and a third message. These messages may be some specific messages, or may be some fields in the messages. These messages may alternatively represent various service operations.

All or some of the foregoing embodiments may be implemented using software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a digital versatile disc (DVD)), a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, which is not limited herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising: receiving a first message requesting to establish a session in a fifth generation (5G) network, wherein a connection of the session is a quality of service (QoS) flow; and determining, based on an access technology type corresponding to the session, whether to send, to an access management network element in the 5G network, a request message requesting to allocate a bearer identifier to a bearer of a fourth generation (4G) network, wherein the bearer corresponds to the QoS flow, and wherein determining whether to send the request message comprises: determining that the access technology type is a non-3rd Generation Partnership Project (3GPP) access; and skipping sending the request message to the access management network element.

2. The method of claim 1, wherein the first message comprises the access technology type from the access management network element.

3. The method of claim 1, further comprising: determining, in a service request process, that the access technology type is changed from the non-3GPP access to a 3GPP access;
sending the request message to the access management network element; and
receiving the bearer identifier from the access management network element.

4. The method of claim 3, further comprising sending the bearer identifier to an access network device and a terminal device, wherein the terminal device requests to establish the session.

5. The method of claim 4, wherein sending the bearer identifier to the access network device and the terminal device comprises sending the bearer identifier to the access network device and the terminal device during a session modification procedure.

6. The method of claim 3, further comprising allocating a flow identifier to the QoS flow.

7. The method of claim 6, further comprising sending N2 session management information comprising the bearer identifier and the flow identifier to an access network device.

8. The method of claim 6, further comprising sending N1 session management information comprising the bearer identifier and the flow identifier to a terminal device, wherein the terminal device requests to establish the session.

9. An apparatus comprising:
a memory configured to store instructions; and one or more processors coupled to the memory, wherein the instructions cause the one or more processors to be configured to: receive a first message requesting to establish a session in a fifth generation (5G) network, wherein a connection of the session is a quality of service (QoS) flow; and determine, based on an access technology type corresponding to the session, whether to send, to an access management network element in the 5G network, a request message requesting to allocate a bearer identifier to a bearer of a fourth generation (4G) network, wherein the bearer corresponds to the QoS flow, and wherein determining whether to send the request message comprises: determining that the access technology type is a non-3rd Generation Partnership Project (3GPP) access; and skipping sending the request message to the access management network element.

10. The apparatus of claim 9, wherein the first message comprises the access technology type from the access management network element.

11. The apparatus of claim 9, wherein the instructions further cause the one or more processors to be configured to: determine, in a service request process, that the access technology type is changed from the non-3GPP access to a 3GPP access; send the request message to the access management network element; and receive the bearer identifier from the access management network element.

12. The apparatus of claim 11, wherein the instructions further cause the one or more processors to be configured to send the bearer identifier to an access network device and a terminal device, and wherein the terminal device requests to establish the session.

13. The apparatus of claim 12, wherein the instructions further cause the one or more processors to be configured to send the bearer identifier to the access network device and the terminal device during a session modification procedure.

14. The apparatus of claim 11, wherein the instructions further cause the one or more processors to be configured to allocate a flow identifier to the QoS flow.

15. The apparatus of claim 14, wherein the instructions further cause the one or more processors to be configured to send N2 session management information comprising the bearer identifier and the flow identifier to an access network device.

16. A method comprising:
receiving, by a session management network element, a message requesting to establish a session in a fifth generation (5G) network, wherein a connection of the session is a quality of service (QoS) flow; sending, by an access management network element, an access technology type corresponding to the session to the session management network element; receiving, by the session management network element, the access technology type; and determining, by the session management network element based on the access technology type, whether to send, to the access management network element, a request message requesting to allocate a bearer identifier to a bearer of a fourth generation (4G) network wherein the bearer corresponds to the QoS flow, and wherein determining whether to send the request message comprises: determining that the access technology type is a non-3rd Generation Partnership Project (3GPP) access; and skipping sending the request message to the access management network element.

17. The method of claim 16, further comprising: determining, by the session management network element in a service request process, that the access technology type is changed from the non-3GPP access to a 3GPP access; sending, by the session management network element, the request message to the access management network element; and receiving, by the session management network element, the bearer identifier from the access management network element.

* * * * *